US007805706B1

(12) United States Patent
Ly et al.

(10) Patent No.: US 7,805,706 B1
(45) Date of Patent: Sep. 28, 2010

(54) PROCESS FOR OPTIMIZING SOFTWARE COMPONENTS FOR AN ENTERPRISE RESOURCE PLANNING (ERP) APPLICATION SAP ON MULTIPROCESSOR SERVERS

(75) Inventors: Tania Trinh Ly, Irvine, CA (US); Kulwipa Praditphollert, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 1409 days.

(21) Appl. No.: 11/157,395

(22) Filed: Jun. 21, 2005

(51) Int. Cl.
G06F 9/44 (2006.01)
G06F 15/177 (2006.01)

(52) U.S. Cl. .................. 717/121; 717/124; 717/168; 709/221

(58) Field of Classification Search ......... 717/120–135, 717/168–173; 709/220–222
See application file for complete search history.

(56) References Cited

U.S. PATENT DOCUMENTS 6,601,192 B1    7/2003   Bowman-Amuah

2003/0046130 A1*   3/2003   Golightly et al. .............. 705/7
2003/0196062 A1   10/2003   Valentin et al.
2006/0047794 A1*   3/2006   Jezierski ..................... 709/221

OTHER PUBLICATIONS

Kemper et al., "Performance Tuning for SAP R/3", Bulletin of the Technical Committee on Data Engineering, IEEE, Jun. 1999, p. 32-39.*
Unisys e-@action Enterprise Server Software Release Notes for Release 3.1 on CS7101; Unisys, Jun. 2001, 19pg.*

* cited by examiner

Primary Examiner—Wei Y Zhen
Assistant Examiner—Ryan D Coyer
(74) Attorney, Agent, or Firm—James E. Goepel

(57) ABSTRACT

In a three-tier ERP implementation, multiple servers are interconnected through one or more network infrastructure. Users may observe poor performance due to the complexity and the number of interconnected components in the implementation. Herein is devised a process for tuning the software component by applying tuning techniques to the OS, SAP application and Database Management System software. For each component, the process identifies potential tuning opportunities of various subcomponents. The process is iterated numerous times through all software components while applying the tuning techniques to derive the most optimal performance for the ERP implementation.

21 Claims, 10 Drawing Sheets

PROCESS FOR OPTIMIZING SOFTWARE COMPONENTS FOR AN ENTERPRISE RESOURCE PLANNING (ERP) APPLICATION SAP ON MULTIPROCESSOR SERVERS

FIELD OF THE INVENTION

In the three-tier client/server SAP Sales and Distribution (SD) implementation, where multiple servers are interconnected with one or more network infrastructure, there is provided a process where one can systematically apply proven methodology for tuning the software components to achieve the best results and avoid poor performance and thereby improve the overall results of the SAP SD implementation. This process is a template for tuning software components on multiprocessor servers.

CROSS-REFERENCES TO RELATED APPLICATIONS

This application is related to co-pending applications listed below which are incorporated by reference:

(a) U.S. Ser. No. 11/157,393 entitled "Process For Optimizing An Enterprise Resource Planning (ERP) Application SAP On Multiprocessor Servers";

(b) U.S. Ser. No. 11/157,394 entitled "Process For Optimizing Hardware Components For An Enterprise Resource Planning (ERP) Application SAP On Multiprocessor Servers".

BACKGROUND OF THE INVENTION

In order for the Enterprise Resource Planning (ERP) SAP to run efficiently on a multiprocessor server in a multi-tier client/server environment, there is devised a process where one can systematically apply proven methodology to evaluate and optimize the software components to achieve the best system performance on multiprocessor servers.

In the entire ERP implementation, software comprises fifty percent of the tuning opportunity. The other fifty percent is hardware tuning. Thus, a fine tuned software component ensures that one is halfway to achieving the goal of a well-tuned ERP implementation.

The description of how each tier interacts with each other, as well as how the SD benchmark was simulated was described in detail in the co-pending application, U.S. Ser. No. 11/157,393, entitled "Process For Optimizing An Enterprise Resource Planning (ERP) Application SAP On Multiprocessor Servers".

Further information on how to fine-tune hardware components was described in the co-pending application, U.S. Ser. No. 11/157,394, entitled "Process For Optimizing Hardware Components For An Enterprise Resource Planning (ERP) Application SAP On Multiprocessor Servers".

The present process focuses on the software layer, which consists of the operating system (OS), an Enterprise Resource Planning (ERP) application SAP, and Database Management System (DBMS) software. The process evaluates and identifies software tuning opportunities for each component in a systematic manner.

SUMMARY OF THE INVENTION

In the entire ERP implementation, software comprises fifty percent of the tuning opportunity. The other fifty percent is the hardware tuning. Thus, a fine tuned software component ensures that one is halfway to achieving the goal of a well-tuned ERP implementation.

Devised herein is a process with proven tuning techniques to optimize an ERP application SAP for better performance on multiprocessor servers in a three-tier client/server implementation.

For the devised process, the focus is only on the software components. This process takes into consideration the Operating System (OS), the SAP application and the Database Management System (DBMS) software. It identifies the potential tuning opportunities for each of those software components.

The process considers each component and evaluates its potential tuning opportunities. For each component, the process further identifies the subcomponents for potential tuning opportunities. For example, after identifying the OS, the process also evaluates the type of OS and the drivers that are supported on that OS.

The process is thus reiterated through all the software components to identify each tuning opportunity and apply tuning techniques to derive at the optimal result. Once all the opportunities are identified and all the tuning techniques are applied, the process is deemed completed. Once the process is completed, optimal performance is achieved and bottlenecks and poor performance is thus avoided.

GLOSSARY OF RELEVANT TERMS

Figure 1:
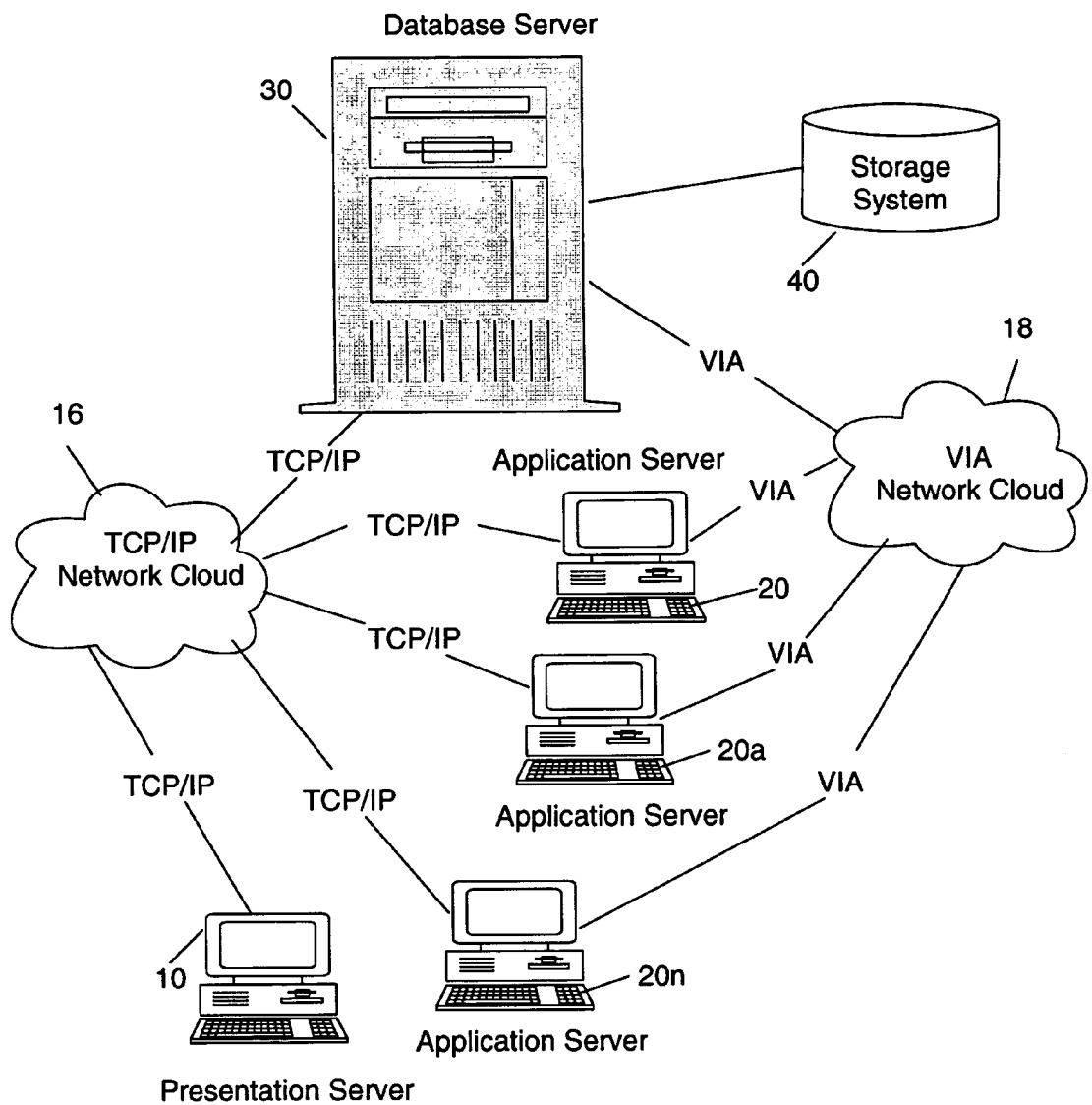
FIG. 1 depicts the entire SAP Sales and Distribution (SD) three-tier benchmark implementation.

1. CROSSBAR INTERCONNECT (CI): A scalable switch device consists of multiple, independent data paths, or pipes that connect processors and Peripheral Component Interconnect (PCI) modules to memory.
2. PROCESSOR MODULE (POD): A module that consists of a crossbar interconnect (CI) and one or two processor submodules (subpod).
3. PROCESSOR/MEMORY NODULE: A hardware module consisting of processor and memory components for 64-bit ES7000 servers. Each module provides mounting locations and supports an interconnection circuitry for four processor chips and 16 dual inline memory modules (DIMMs).
4. PROCESSOR SUBMODULE (SUBPOD): It is one of the two processing units in a processor module (pod). One processor submodule contains up to four processors, first- and second-level cache, shared cache, and interconnection logic.
5. ES7000: A family of Unisys multiprocessor servers. ES7000 is a multiplatform server supporting Windows™, Linux, MCP operating systems, OS2200 systems and other applications.
6. SHARED CACHE: A cache shared by multiple processors in the same processor submodule.
7. VIRTUAL INTERFACE ARCHITECTURE (VIA): Virtual Interface Architecture (VIA) is a communication protocol that provides a direct path for applications, bypassing the operating system interfaces and achieving very high throughput. Giganet cLAN is the first native implementation of VIA and is used in the Unisys benchmark environment. Giganet cLAN delivers high throughput and low latency interconnection of multiple servers. Giganet cLAN provides full-duplex throughput of 1.25 Gb/s (20 Gb/s aggregate). Due to small port-to-port latency and minimal CPU overhead, Giganet cLAN is used for data transferring between application servers and the database server.
8. DIRECT I/O BRIDGE (DIB): DIB is hardware unit in the ES7000 where the peripheral component interconnect (PCI) buses are located. It provides a path from the processors and memory to the PCI buses.
9. 32-BIT ARCHITECTURE: 32-bit is a term applied to processors, and computer architectures that manipulate the address and data in 32-bit "chunks" of 4 bytes data.
10. 64-BIT ARCHITECTURE: A computer architecture described as "64-bit" generally has integer registers that are 64 bits wide and thus directly supports 64-bit "chunks" of data.
11. INTERRUPTS: Interrupts are signals that a device can send to a processor when the device is ready to accept or send information.
12. DATA LOCALIZATION: Data localization refers to a method of placing data in a local cache or the nearest memory area in order to provide fast access to the data and reduce memory latency.
13. SYSTEM LATENCY: System latency refers to the delay required to complete a given operation. For example, memory latency describes the delay introduced when a data needs to be transferred from memory to the processors.
14. CACHE COHERENCY: The synchronization of data located in one or more caches and the memory so that data retrieval from any location will return the most recently written data.
15. THREADS: Threads are the smallest units of execution that runs a program or performs a task.
16. FIBERS: Fibers are lightweight SQL Server threads. Using fiber can reduce the number of context switches by enabling SQL Server, rather than the OS scheduler, to handle scheduling.
17. CONTEXT SWITCH: Context switch is a state where the OS in multiprocessing environment suspends one process from execution on a CPU and starts processing another process. The OS needs to record the environment or context of the suspended process so that it can resume the service for the suspended process in the future. Context switch is expensive. To achieve good performance, it is necessary to reduce the context switch management overhead or to have an effective scheduler that does not require too many context switches.
18. USER-NODE SCHEDULER (UMS): UMS is SQL Server scheduler. When SQL Server is started, a UMS scheduler is created for each processor in the system. These UMS schedulers control the scheduling of threads and fibers in the system. These schedulers ensure SQL Server can maximize operating system resource usage in relation to key database actions.
19. DATABASE: A database is information set with a regular structure. Any set of information may be called a database. Nevertheless, the term was invented to refer to computerized data, and is used almost exclusively in computing.
20. MAX WORKER THREADS: Use the max worker threads parameter to specify the maximum number of Windows threads that SQL Server can use. One can adjust this parameter to enable more threads for processing within SQL Server. If SQL Server uses too many threads, the OS becomes overloaded.
21. MAX SERVER MEMORY: SQL Server allocates memory dynamically. Set the max server memory option to specify the maximum amount of memory, in megabytes (MB), that SQL Server will allocate to the buffer pool. Because SQL Server will take some time to release memory, set the max server memory option so that SQL Server leaves some memory free for other applications. The default value is 2147483647, which directs SQL Server to acquire as much memory as it can from the system while dynamically allocating memory as other applications require it. This is the recommended setting for a dedicated SQL Server system.

Use the max server memory option in conjunction with min server memory option to designate the upper and lower limits for memory allocated by SQL Server. The max server memory option takes effect immediately, with no need to restart SQL Server.

22. MIN SERVER MEMORY: Use the min server memory option to specify the minimum amount of memory, in megabytes (MB) that is to be allocated to the SQL Server buffer pool. Setting this parameter is useful in systems in which SQL Server might reserve too much memory for other applications. For example, if the server is used for print and file services as well as for database services, SQL Server might relinquish too much memory to these applications and slow down user response times.

The default value of min server memory is zero (0), which enables SQL Server to dynamically allocate and de-allocate memory. It is the recommended setting, but change the value if the server is not dedicated to SQL Server. This option takes effect immediately, with no need to restart SQL Server.

23. SET WORKING SET SIZE: The set working set size option specifies that the memory allocated by SQL Server cannot be swapped out, even if that memory can be more effectively used by another process. This option reserves physical memory space for Microsoft® SQL Server™ that is equal to the server memory setting. Do not set this option if SQL Server is allowed to use memory dynamically. Use this option only when min server memory and max server memory are set to the same value. In this case, SQL Server allocates a static amount of non-pageable memory.

24. APPLICATION: Application software designed to perform specific functions. SAP is an example of a business application allowing users to perform business transactions.

25. APPLICATION LEVEL: Application level includes all components in the application tier. These components provide application services, such as SAP R/3.

26. APPLICATION SERVER: An application server refers to a computer system that provides application services, e.g. the SAP R/3 business application used in the benchmark environment. This business application allows users to process specific business requests.

27. BENCHMARK DRIVER: A benchmark driver refers to a toolkit that simulates user workload on the presentation tier of the three-tier SAP benchmark environment.

28. BENCHMARK EXECUTION: Benchmark execution is the process of running the benchmark to simulate user workload and to measure the performance of the SAP system.

29. BENCHMARK RAMP-UP PHASE: This is the initial phase in the SAP SD benchmark. It comprises one or more users logging on the SAP system.

30. BENCHMARK TEST: A benchmark test measures the performance of different computer systems. The benchmark results offer objective statements about how a system performs.

31. BENCHMARK USER: A benchmark program generates benchmark users in order to simulate real-world users performing SAP transactions.

32. BUS: A common internal interface in a computer that provides a path for transferring data, address, control, or status signals from one part of the computer to others.

33. CACHE: A high-speed memory or storage device that helps reduce the time required to read and write data to a slower device, such as main memory or hard drive. When cache memory is installed, the processor looks for data in the cache first. If the data is found in cache because it has been read previously, the processor does not have to read the data from main memory.

34. CALL CENTER AGENT: A SAP user who is using a SAP call center application module. The call center user is considered an experienced user who needs to interface with the SAP GUI frequently.

35. CHIP: A group of circuits designed to perform related tasks.

36. CLUSTER: A cluster is a group of four-processor building blocks.

37. CONCURRENT USERS: Refers to the users who connect to an SAP R/3 system to perform one or more activities within a given interval of time.

38. CENTRAL PROCESSING UNIT (CPU) TIRE: CPU time is an indicator of processor activity observed during a specific interval. CPU time is often measured in the unit of % Processor time, which is the percentage of elapsed time that the processor spends to execute a non-idle thread.

39. DATA FILE: Files that contain information that is essential for running SQL Server application.

40. DATABASE LEVEL: Database level includes all components in the database tier. These components are responsible for storing, retrieving and providing data to the application tier.

41. DATABASE SERVER: A database server is a computer that provides database services enabled by Database Management System software. The database services allow users to store, retrieve, and manipulate data. The database services listen to and process user requests by communicating with application servers. The Database Management System software for the benchmark is 32-bit Microsoft SQL Server 2000.

42. DELIVERY: A document contains delivery information of the order from a customer.

43. DIALOG RESPONSE TIME: Dialog response time is a measuring unit determining how fast the system responds to a user request. In the benchmark implementation, an absolute limit of the dialog response time is two seconds.

44. DIALOG STEP: Dialog step is a single unit of operation performed by a dialog work process.

45. DIALOG USERS: This term refers to the users who are currently performing the steps in the Sales and Distribution (SD) transactions. There are a total of 18 dialog steps in the SD benchmark.

46. DISK STRIPING: Also known as RAID 0 where data is written in sequential sectors across multiple drives. Disk striping offers no protection for data because there is no data redundancy, but can increase performance dramatically as information can be written to or retrieved from several drives at once, minimizing the overall seek time in large files.

47. ENTERPRISE RESOURCE PLANNING (ERP): An information system or process integrating all manufacturing and related applications for an entire enterprise. ERP systems permit organizations to manage resources across the enterprise and completely integrate manufacturing systems.

48. FIRST LEVEL CACHE: The onboard memory built into the same chip with a microprocessor. The processor first checks the first-level cache to see if it holds data previously retrieved from the main memory.

49. GIGABIT ETHERNET: Gigabit Ethernet is a networking protocol built on top of the Ethernet protocol. Gigabit Ethernet yields a data transfer rate of 1,000 megabits per second (Mbps), or 1 gigabit per second (Gbps). Gigabit is a dominant protocol in high speed local area network backbones and server connectivity. In the benchmark environment, Gigabit network is used for transferring data between application servers and presentation servers.

50. HARDWARE: Hardware refers to physical components of a computer system that allow a computer to operate. Main components include CPU, memory, peripheral devices, etc.

51. HOST BUS ADAPTER (HBA): HBA is a hardware device that typically provides an interface from peripheral devices to the processor.

52. HYPER-THREADING: An Intel™ technology that allows a single physical processor to execute multiple threads or instruction streams simultaneously, potentially providing greater throughput and improved performance. These processors contain two architectural states on a single processor core, making each physical processor act as two logical processors for the operating system. However, the two logical processors still share the same execution resources of the processor core, so performance gains do not approximate two complete, physical processors.
53. IDENTIFYING A COMPONENT/SUBCOMPONENT: A process of evaluating each tier and categorizing each component in an appropriate group for improvement opportunities. The components can be classified as hardware and software. Within each component, one can further break down the subcomponents. For example, within the software component, there are subcomponents, which include operating system, SAP application, and Database Management System software.
54. INVOICE: An invoice document that is associated to a particular order.
55. I/O BRIDGE: Input/Output Bridge connects Peripheral Component Interconnect (PCI) bus to processors and memory. The I/O Bridge connects to the processor and memory by the Crossbar Interconnect (CI).
56. INTERLEAVING: A method of addressing memory to spread the memory service requests across the memory modules and reduce the time waiting for service.
57. KERNEL TIME: Kernel time indicates the processor activity for executing system code. Kernel time is often referred as privileged time and measured as a percentage of elapsed time that the process threads are spent executing system code in privileged mode.
58. LIST ORDER: A business transaction that allows a user to list all of the orders created earlier.
59. LOCKING SITUATION: Locking situation is a state where an object is being used exclusively by one process. During that period, the object is being blocked and cannot be accessed by another process. Too many locking situations may hinder system performance as many processes must spend time waiting for objects to become available.
60. LOGICAL CPUs: See definition of "Hyper-Threading".
61. LOGICAL UNIT NUMBER (LUN): An identifier assigned to a storage volume. Each storage volume is assigned a unique logical unit number.
62. NETWORK: Network is a group of computers and associated peripherals connected by a communication channel capable of sharing files and other resources between several users.
63. ONLINE USERS: This term refers to a person who is connecting to a computer system to perform some Sales & Distribution (SD) transactions via the SAP Graphical User Interface (GUI).
64. OPERATING SYSTEM: Operating System is the software responsible for allocating hardware resources and interfacing with users.
65. OPTIMAL PERFORMANCE: Optimal performance refers to the point at which a server is capable of handling the maximum number of users without the performance degrading beyond a predetermine response time limitation. In SAP SD benchmark implementation, the response time must be less than 2 seconds.
66. OPTIMAL RESULT: Optimal result is the point at which a server is capable of handling the maximum workload without performance degradation and yields a response time within the predetermined limit. In SAP SD benchmark implementation, the response time must be less than 2 seconds.
67. ORDER: A document called a customer order created by a SAP user whose role is a sales representative.
68. PERFORMANCE PARAMETERS OF AN SAP SYSTEM: Performance parameters are means to measure the performance of an SAP system. The most common parameters include dialog response time, database request time, CPU utilization, memory consumption, I/O utilization, and network utilization.
69. POWER USERS: Refers to the users who are controlling the Sales and Distribution (SD) process.
70. PRESENTATION LEVEL: Presentation level includes all components in the presentation tier that provide interfaces between users and the application, as well as the database tiers.
71. PRESENTATION SERVER: Also refer to as driver. A presentation server is a computer responsible for formatting the Graphical User Interface. It is the interface between the users and computers providing required services. In general, a user enters a request via a presentation server. The request will be forwarded to an application and a database server. Once the presentation server retrieves the result back, it formats and presents the result to the user.
72. PERIPHERAL COMPONENT INTERCONNECT (PCI) BUS: PCI bus is a local bus standard with multiple PCI slots that support PCI cards. The PCI bus is the interface between the I/O Bridge and the PCI card.
73. PERIPHERAL COMPONENT INTERCONNECT (PCI): A standard that enables communication between processors and peripheral devices.
74. POPULAR TRANSACTIONS: Refer to frequently accessed business transactions by SAP users. In the SAP SD benchmark implementation, the most popular transactions include create an order, create a delivery, display a customer order, change the delivery, list the order, and create an invoice.
75. PROTOCOL: A set of rules or standards describing methods to achieve compatible transmission and receipt of data (e.g. message packets) over a network.
76. REDUNDANT ARRAYS OF INEXPENSIVE DISKS (RAID): Multiple disk units combined into single logical device to increase data availability and performance.
77. SALES AND DISTRIBUTION (SD): SD is an application module of the SAP software, which deals with the aspect of sales and distribution, e.g. creating customer order, delivery and invoice.
78. SYSTEMS AND APPLICATION PRODUCTS (SAP): SAP is the company that supplies the SAP R/3 software, which is used for financial, Human Resources (HR) and plant maintenance transactions and reporting.
79. SAP BENCHMARK TOOLKIT: SAP benchmark toolkit is a toolset provided by SAP. The toolkit consists of programs and script files that allow a user to simulate SAP user workload.
80. SAP DATA FORMAT: SAP data format is a data layout required by SAP. Before a user request can be processed or displayed on the SAP GUI program, the data must be converted into the SAP data format.
81. SAP R/3 STANDARD APPLICATION BENCHMARK: The SAP R/3 standard application benchmark is a standardized industry benchmark provided by SAP. It measures hardware and database performance using the SAP application. It consists of script files that simulate typical transactions and the workflow of an SAP R/3 user. A predefined SAP client database contains sample company data used in the testing procedure.
82. SCRIPT FILES: Script files consist of a series of executable programs or commands. Script files are used as part of the benchmark tools in order to simulate SAP user workload in the benchmark environment.

83. SECOND-LEVEL CACHE: Cache memory built into separate memory chips. Second-level cache is memory that a processor can access more quickly than main memory (regular RAM).
84. STACKING: A method of addressing memory where consecutive memory service requests access the same memory module.
85. STORAGE PROCESSOR (SP): An intelligent RAID controller that is enclosed within a storage device.
86. STORAGE SYSTEM: A physical component that allows users to store data.
87. TRANSMISSION CONTROL PROTOCOL/INTERNET PROTOCOL (TCP/IP): A suite of communication protocols used for transmitting data over networks. In addition, TCP/IP is widely used to connect hosts on the Internet. All servers in the benchmark environment are connected over TCP/IP network.
88. THREE-TIER CLIENT/SERVER ARCHITECTURE: The three-tier client/server architecture consists of three service layers including a database, an application, and a presentation layer. Those services are running on different servers. The three-tier client/server configuration provides for the database layer and application layer to exist on separate systems with the workload driven by a presentation server.
89. TIER: Refers to a dedicated layer of components working together to provide specific services. The three-tier client/server architecture consists of the database, the application, and the presentation tiers. Tier and layer may be used interchangeably.
90. TRANSACTION LOG FILE: The transaction log is used to record changes to the database, thus allowing the system to recover in the event of a failure.
91. TUNING TECHNIQUE: A methodology of changing the parameters of a device or a system to achieve a specified or improved performance.
92. TYPICAL TRANSACTIONS: Refers to business transactions used by SAP users. The typical transactions are necessary for users to perform their jobs but are not executed as often as the "popular" transactions.
93. USER INTERFACE PROGRAM: A user interface program allows a user to interact with a computer. The user interface program allows a user to enter a request and presents a result to the user in an appropriate format. A special form of a user interface program is called Graphical User Interface (GUI). GUI takes advantage of the computer's graphical capability to make the program easier to use. User interface programs including GUI run on a computer called a presentation server.
94. USER THINK TIME: User think time refers to the time a user needs to process the information before entering additional inputs or moving onto the next screen. For benchmark implementation, the user think time is 10 seconds.
95. INDEXPROPERTY FUNCTION: A function in SQL Server that returns the named index property value given a table identification number, index name, and property name.
96. <SAPSIDDB> PARAMETER: A unique identifier for a SAP database.
97. PROFILE PARAMETERS: SAP R/3 configuration parameters that allow a user to control certain aspects of SAP behavior like buffer size, memory size, database specific performance options and work process affinity.
98. SAP INSTANCE: An SAP instance is an administrative unit that combines SAP components that provide one or more services and can be started and stopped together. The instance usually contains more than one SAP work processes. Each SAP work process requires a certain amount of memory to store data temporarily during run time.
99. TRANSACTION SNRO: SNRO is number range object maintenance transaction in SAP, which allows users to maintain number range objects. Some SAP business documents require a unique identifier key. The key is created using numerical or alphanumerical characters stored in number ranges. The transaction SNRO allows users to maintain number ranges such as define the ranges, buffer the number ranges, etc.
100. SQL SERVER: This is a Microsoft database management server.
101. BACKEND SQL SERVER SYSTEM: Backend SQL Server system is referring to a computer system providing database services where user has no direct contact. To minimize confusion, simply refer as SQL Server system.
102. SQL SERVER INSTANCE: One SQL Server instance refers to one copy of SQL Server software running on a computer system.
103. SQL SERVER 2000: The current version of Microsoft database management software often referred to as SQL Server.
104. SQL SERVER 2000 SERVICE PACK: A Service Pack (more commonly, SP) is the mean by which Microsoft distributes updates, bugs correction and new features for SQL Server 2000.
105. SQL AS AN APPLICATION: SQL should be referred to as SQL Server, more specifically SQL Server 2000. SQL Server 2000 is a Database Management System (DBMS) software or application. Software, software program, program and application are the same and can be used interchangeably.
106. SQL STATEMENTS: Method for querying or manipulating the SQL Server database. For example: CREATE TABLE, DROP TABLE, ALTER TABLE, RENAME TABLE.
107. AUTOSTATS: A statistical maintenance function in SQL Server. Autostats automatically update the statistics for a particular table when a "change threshold" has been reached.
108. PAGE-LEVEL LOCK: The locking granularity for queries in SQL Server. For performance reason, it is better to use less intrusive row-level or table-level lock as opposed to page-level lock.
109. PAGING FILES: Paging files are system files located on disks. Paging files are used for storing temporary data required during data processing when the system does not have enough physical memory to store the data.
110. TABLE BUFFERING: Table buffering is a mechanism to buffer or store some tables on an application server in order to minimize the amount of data being sent to and from the database server.

DESCRIPTION OF PREFERRED EMBODIMENT

FIG. 1 depicts the entire SAP Sales and Distribution (SD) three-tier benchmark implementation. The implementation consists of one database server, multiple application servers, and multiple presentation servers. All servers are connected and communicate over a TCP/IP network. In addition, the application servers are connected to the database server through the high speed and high bandwidth Virtual Interface Architecture (VIA) network.

As seen in FIG. 1, the three-tier benchmark implementation includes a database server 30, which is connected to a storage system 40. The database server 30 communicates with a presentation server 10 and a group of application servers 20a ... 20n via TCP/IP network, which is represented by a TCP/IP network cloud 16. The TCP/IP protocol allows all servers in the network to communicate and transmit data. Similarly, the database server 30 communicates with the application servers 20a ... 20n via a Virtual Interface Architecture (VIA), which is represented by a VIA network cloud 18. The VIA communication protocol provides a high speed and high bandwidth communication between the database server 30 and the application servers 20a ... 20n. In the benchmark implementation, a database server is running Microsoft SQL Server to provide database services.

Figure 2:
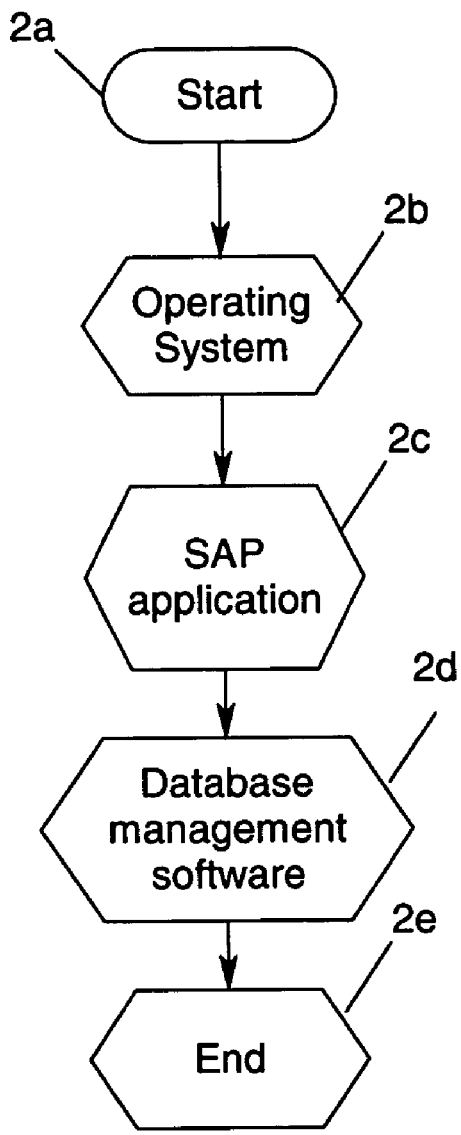
FIG. 2 illustrates the first step in the process, which is to identify the software components.

FIG. 2 depicts the software components in sequence for the multi-tier client/server environment. This is the first step in the sequence. The software components consist of the OS, SAP application, and DBMS. It is considered a large part in the multi-tier client/server implementation. Care must be exercised to ensure the "most bang for the buck" approach to software tuning. One way to achieve the best optimization is by following the best practices as described in this disclosure to evaluate and tune each component and its subcomponents so that the optimal performance is achieved and bottleneck is avoided.

The first sequence in the process is to identify the software components and isolate each component into different categories including:

a. OPERATING SYSTEM (OS) (Step 2b): The OS manages the hardware and software resources of the system. On a server, these resources include such things as the processor, memory, disk space, etc. It also provides a stable, consistent way for applications to deal with the hardware without having to know all the details about the hardware.

b. SAP APPLICATION (Step 2c): SAP application is a suite of business software applications developed by SAP and runs on the OS. SAP application requires Database Management System software to manage and store data.

c. DATABASE MANAGEMENT SYSTEM SOFTWARE (DBMS) (Step 2d): The DBMS is a suite of computer programs designed to manage a database, a large set of structured data, and to run operations on the data requested by numerous users.

The first process sequence is shown in FIG. 2 as a sequence of operations. The sequence starts at step 2a and proceeds to operating system selection at step 2b. The next step is the SAP application selection at step 2c. Subsequently at step 2d, a selection is made for the Database Management System software, after which the sequence ends at step 2e.

The first process sequence identifies the software components. Once the software components are identified, tuning techniques can be applied to each components and their subcomponents in the later steps of the process. These tuning techniques are described later.

Figure 3:
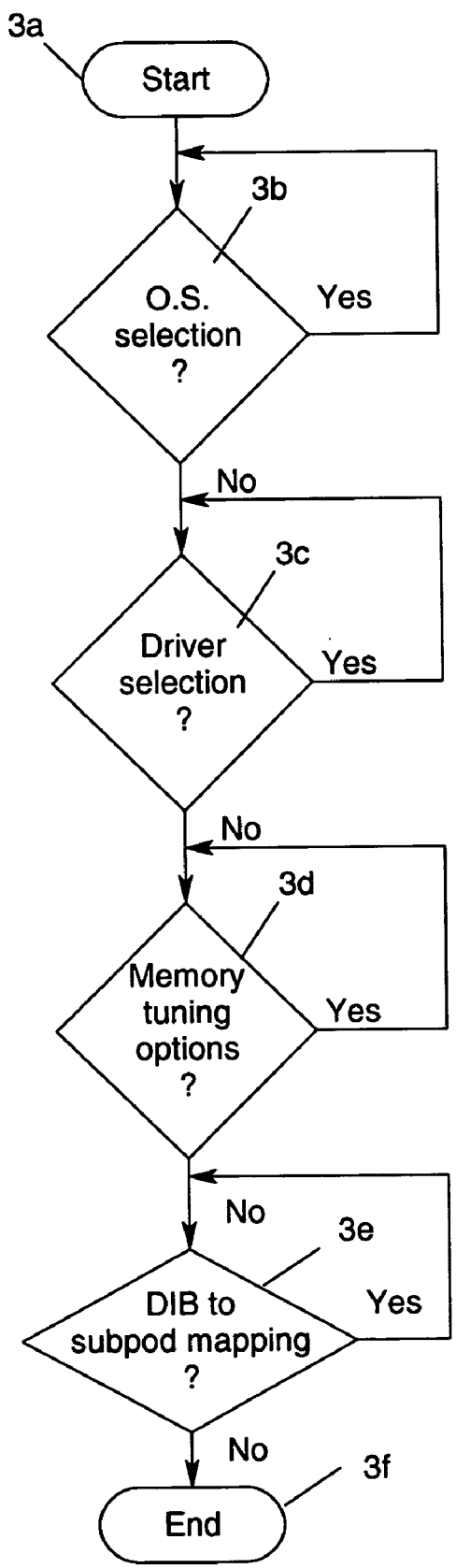
FIG. 3 illustrates the second step in the process, which is to identify tuning opportunities for the Operating System (OS) components and its subcomponents. This step includes the OS selection, device driver selection, memory management, and Direct I/O Bridge (DIB) to subpod mapping.

FIG. 3 identifies the second process sequence which is to identify tuning opportunities in the OS level and its subcomponents. This step encompasses the following steps:

1. OS Selection (Step 3b): For the OS selection, consideration must be placed on the processor type i.e. 32-bit vs. 64-bit technology, the number of processors, the amount of memory, and hardware devices. Select an OS that supports either a 32-bit or 64-bit depending on the server technology. For example, Microsoft Windows OS family comes in different versions; each version supports a different type of server technology and requires a different amount of system resources. Select the OS that supports the hardware architecture and hardware resources in the computer system to ensure there are no compatibility issues and all hardware resources are fully utilized.

2. Driver Selection (Step 3c): The OS manages a hardware device through a device driver. Selecting the correct device drivers allows the OS to interface with the device effectively and avoid potential bottleneck and to improve overall system performance.

3. Memory Management (Step 3d): Memory management is critical to the performance of a 32-bit system due to the addressable memory space limitation. On a 32-bit system, memory can only be addressed up to 4 GB or $2^{32}$, which means a memory address that is 32 bits long can only refer to 4.2 billion ($2^{32}$=4.2 billion) unique locations. At the OS level, different memory management techniques can be deployed to improve system performance and scalability.

4. Direct I/O Bridge (DTB) To Processor Submodule (Subpod) Mapping (Step 3e): The OS handles I/O requests from any hardware devices through I/O interrupts. On a 32-bit ES7000, all of the I/O interrupts generated by all of the host bus adapters (HBAs) in a direct I/O bus can be directed to a specific subpod for processing. This technique is called DIB-to-subpod mapping. This technique improves I/O performance by keeping a process and its corresponding I/O interrupts together within the same subpod to take advantage of data localization because the data are located in the shared cache. As a result, system performance improves as the system latency, involved in cache coherency, is eliminated.

The second sequence in the process is shown in FIG. 3. The sequence starts at step 3a and proceeds to step 3b, which requires a decision to select the OS. If the answer is "YES", the sequence repeats at step 3b. If the answer here is "NO", which means no further OS selection tuning is required, the sequence then proceeds to step 3c. At step 3c, a decision to select a driver is made. If the answer is "YES", then the sequence repeats at step 3c until no further driver selection tuning is required. If the answer is "NO", the sequence proceeds to step 3d. At step 3d, a decision to tune memory is made. If the answer is "YES", repeat step 3d until no more memory tuning is required. The sequence then goes to step 3e, which requires a decision whether to perform Direct I/O Bridge (DIB) to subpod mapping. If the answer is "YES", repeat step 3e until no more tuning is needed. If the answer is "NO", proceed to step 3f, where the sequence ends.

For the OS selection in step 3b of FIG. 3, place consideration on selecting the right OS for the server technology and hardware resources. The OS comes in different versions and each version supports a minimum hardware resource requirement. Select the OS version the hardware can support, given the type of processors, the amount of physical memory in the server, and all hardware devices. In addition, select the OS version that fully utilizes the hardware resources in the system. For example, if Windows Server 2003 is the OS of choice and the server platform is a 32-bit server that has 32 processors and 32 GB of memory, select Windows Server 2003 Datacenter Edition because this is the only version of Windows Server 2003 that can support up to 32 processors on a 32-bit platform. Choosing an incorrect OS version may degrade the performance as it prevents all system resources to be fully utilized. Table I shows examples of different versions of Windows Server 2003 and the resources that each can support.

Table I illustrates Windows Server 2003 editions and resources.

TABLE I

| Windows Server 2003 | 64-Bit Technology Support | Maximum Memory Support | Maximum No. Of Processors Support |
|---|---|---|---|
| Standard Edition | No | 4 GB | 4 |
| Enterprise Edition | Yes | 32 GB (32-bit), 64 GB (64-bit) | 8 |
| Datacenter Edition | Yes | 64 GB (32-bit), 512 GB (64-bit) | 32 (32-bit), 64 (64-bit) |
| Web Edition | No | 2 GB | 2 |

For Driver Selection in step 3c of FIG. 3, select the appropriate device drivers to ensure optimal performance. A device driver, often called driver, refers to the software used by the OS to manage a particular hardware device. Selecting the right driver is critical because it determines the performance of the hardware devices, which consequently affects the overall performance of the whole system.

During the OS installation, most hardware devices are detected and the OS automatically installs associated drivers. In some cases, the OS cannot recognize the device during the installation, thus a user must manually install a driver after the OS installation completes.

For some hardware devices, it is better to replace the default driver with one that yields better performance. For example, better performance can be achieved for disk storage HBA by replacing the default driver with one provided by the manufacturer and selecting an appropriate protocol that supports the disk storage.

For Memory Management in step 3d of FIG. 3, it is important to place consideration on memory Management tuning because it is an area of concern for 32-bit technology. For the 32-bit technology, addressable memory is limited to 4 GB. However, there are tuning techniques that allow users to improve system performance through the use of Physical Address Extension (PAE) and /3 GB switch. These tuning techniques are unique to the 32-bit technology.

Physical Address Extension (PAE): PAE is a complementary technology for Intel 32-bit processors to address more than 4 GB of physical memory. Windows 2000 Advanced Server, Windows 2000 Datacenter Server, Windows Server 2003 Enterprise Edition, and Windows Server 2003 Datacenter Edition can use PAE to take advantage of physical memory beyond 4 GB. With PAE technology, the OS moves from a two-level linear address translation to a three-level address translation. The extra layer of translation provides access to physical memory beyond 4 GB.

When an application process runs on the OS, it accesses memory space, which is a combination of physical memory and virtual memory. More memory is required when there are more applications, or processes, running on the server. In this case, the paging process increases dramatically and adversely affects the system performance. Applications can benefit from PAE because it provides more physical memory to a program. This reduces the need to swap the memory in the form of paging and in turn increases performance. A computer needs temporary space to store data during processing. As long as the physical memory is not fully consumed, the data can be stored in physical memory. However, as more applications are running, they consume more physical memory, and therefore need virtual memory beyond what is available in physical memory by using a part of the disk to temporary store information. Since information is moved to/from physical memory to disk in fixed size units called "Pages", the file is referred to as "Page File". Paging process refers to the way the system accesses paging files to store and retrieve data. Paging process can introduce poor performance, as accessing files from disks is slower than memory.

Whenever possible, enable PAE if the server has more than 4 GB of physical memory and an application can address memory larger than 4 GB. To enable PAE, use the /PAE switch in the boot.ini file.

/3 GB Switch: Typically, a process running under Windows 2000 or Windows 2003 32-bit can access up to 4 GB of memory address space with the combination of physical and virtual memory. By default, about 2 GB of this is reserved for the kernel or the OS, and about 2 GB is reserved for user mode programs or applications.

As more programs, and, therefore, more processes are running, more memory may be needed for up to the full 2 GB of addressable user space. This leads to adverse performance. The /3 GB switch allows the OS to allocate the virtual address space to give the user mode programs about 3 GB of space and limit the kernel to about 1 GB. In fact, the usable user mode program space is increased to 2.7 GB. Performance improves as user programs benefit from the additional space by using the /3 GB switch.

Enable the /3 GB switch if there are several applications running on the server or that the application is memory intensive. To enable /3 GB, use the /3 GB switch in the boot.ini file. If the server has more than 16 GB of physical memory, do not use the /3 GB switch because the OS needs more than 1 GB for the kernel to manage a system with more than 16 GB of memory.

For DIB to Subpod Mapping in step 3e of FIG. 3, this feature is specific to the 32-bit architecture as it uses the DIB-to-cluster low priority routing (LPR) interrupt binding format to pass DIB-to-cluster assignments to the hardware abstraction layer (HAL).

For ES7000 32-bit technology, implement DIB to subpod mapping to direct I/O interrupts from a specific DIB to a subpod. By controlling I/O interrupts through the DIB to subpod mapping, system performance can be improved.

If every DIB has at least one HBA and all processors across the system are evenly utilized, enable DIB to subpod mapping in order to keep a process and its corresponding I/O interrupts together on the same subpod. This way, it can improve system performance because the data associated with the I/O operations are stored on the shared cache and thus eliminate the memory request latency time by accessing data across subpods.

To enable DIB to subpod mapping, use /CLSTR switch together with a cluster string in boot.ini.

The third sequence in the process (FIG. 4) is to identify tuning opportunities in the SAP application component and its subcomponents. How each component will be evaluated and tuned can be summarized as follows:

1. SAP Memory Management (Step 4b): Each SAP process requires a certain amount of memory to run. By allocating the proper amount of memory to a SAP process so that it can run effectively without starving other processes that are running on the same system can improve overall system performance.
2. Configure The SAP Work Process Type And Amount (Step 4c): The SAP application processes, also referred to as work processes, perform unique functions, such as update, dispatch etc. . . . . To achieve optimal results, configure the correct types of work process as well as the number of work processes based on hardware resources and workload.

3. SAP Processor Affinity (Step 4d): The ability to assign SAP work processes to run on specific processors is called SAP processor affinity. SAP processor affinity improves overall system performance because processes share the data, which resides on the shared cache among groups of processors and thereby minimizes system latency.

4. Table Buffering (Step 4e): SAP uses various buffers such as table buffers, program buffers, repository buffers, etc. . . . and these buffers are located on an application server. One way to improve performance is to buffer some tables on an application server to minimize the amount of data being sent to and from the database server. Table buffering offloads processing to the application servers, reducing the stress on the database server.

5. Number Range Buffering (Step 4f): When a SAP business document such as a customer order, a billing document, a shipping document etc. . . . is generated, a document number is assigned. The document numbers are kept as number ranges in a database table called NRIV. When many users are working at the same time, system bottlenecks can occur in number range assignment because the NRIV table remains locked until a process that issues a lock request completes the number assignment. One way to improve system performance is to buffer the number range objects. Selecting the appropriate value for the objects helps to avoid most direct access to the table NRIV. When configuring SAP R/3 instances, care is taken to avoid buffer swaps during the benchmark run. The sizes of all buffers, like the ABAP program buffers, are set accordingly. In the SD benchmark, the buffering of number ranges for certain SAP R/3 objects is permitted. Each SAP R/3 instance reserves its own ranges at startup and maintains them locally, thus saving the accesses to the NRIV table of the database that would otherwise provide unique identifiers.

There are also cases in which the use of a local update dramatically reduces scalability. Contention on table NRIV may result when documents are created with automatic numbering using un-buffered number range objects. In case of a local update, there is no database commit until the updates are completely processed, which can lead to severe serialization effects on the database table NRIV.

If the number range object is buffered in main memory, no database access is necessary, and no contention will result. If it is not, an update on the database table NRIV has to take place.

Figure 4:
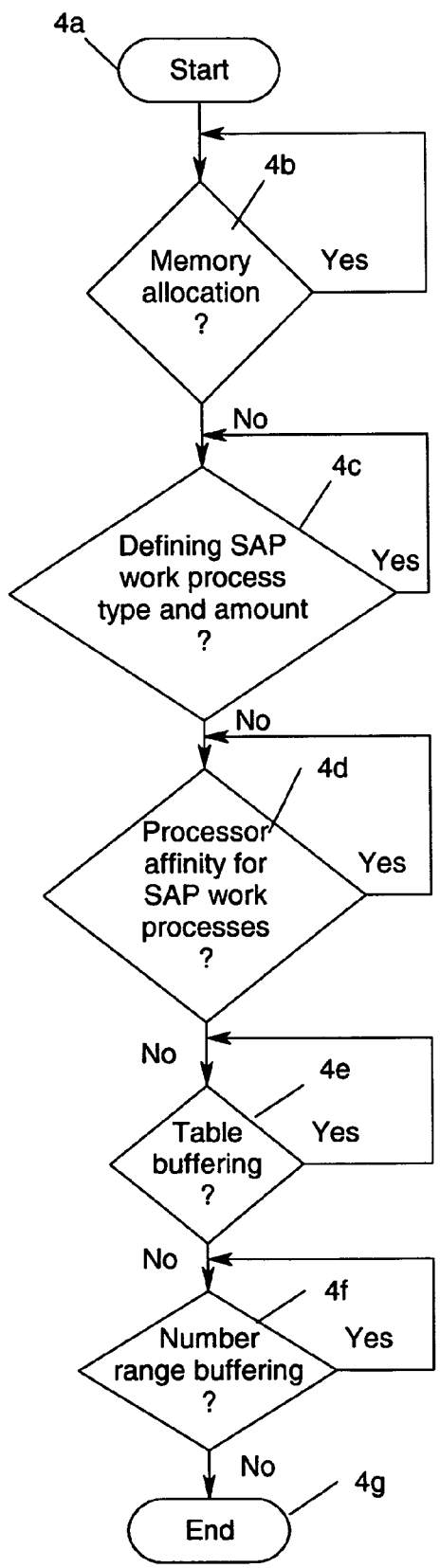
FIG. 4 illustrates the third step in the process, which is to identify tuning opportunities in the SAP application component and its subcomponents. This step includes SAP memory management, how to configure the SAP work process type and amount, SAP processor affinity, table buffering, and number range buffering.

FIG. 4 identifies the third sequence in the process. FIG. 4 starts at step 4a and proceeds to step 4b, where a decision whether to continue with memory allocation tuning is required. If the answer is "YES", then the sequence repeats at step 4b. If the answer to step 4b is "NO", the sequence proceeds to step 4c. At step 4c, a decision is made whether to define SAP work process type and amount. If the answer is "YES", then repeat step 4c. If the answer is "NO", the sequence proceeds to step 4d. At step 4d, a decision is made whether to apply SAP processor affinity. If the answer is "YES", repeat step 4d. If the answer is "NO", proceed to step 4e. At step 4e, a decision is made whether to buffer a table. If the answer is "YES", repeat step 4e. If the answer is "NO", the sequence continues on to step 4f where a decision is made whether to buffer the number range. If the answer is "YES", then repeat step 4f. If the answer is a "NO", then the sequence ends at step 4g.

In Step 4b of FIG. 4, SAP Memory Management, the memory must be given for SAP application processes to run effectively without starving other processes running on the same system. Typically, SAP R/3 application server contains one or more SAP instances. An instance is an administrative unit that combines SAP components that provide one or more services and can be started and stopped together. The instance usually contains more than one SAP work process. Each SAP work process requires a certain amount of memory to store data temporarily during run time.

There are two main memory areas in step 4b for SAP processes, the memory area that is available exclusively to each work process, and the memory area that can be shared by all work processes in the same instance. When allocating the memory to a SAP application, both exclusive and shared memory areas must be configured.

To achieve optimal performance, follow the following strategy:

1. Allocate Enough Memory For Exclusive And Shared Memory Areas: Make sure each work process can run effectively. Monitor SAP memory usage as well as system response time. Long response time may indicate memory bottleneck and one must adjust the memory configuration appropriately.

2. Make Sure Physical Memory Is Available: If there is not enough physical memory required for an SAP instance to run, consider reducing the number of instances or SAP work processes. Alternatively, consider increasing virtual memory by adding paging files. However, swapping to disk I/O is a lot slower than memory. Thus, adding too many or large paging files without having enough physical memory can have adverse performance impacts.

3. Understand The Limitation Of The Hardware Architecture: If a user uses 32-bit technology, the addressable memory space is limited to 4 GB. If the system has physical memory larger than 4 GB and has SAP instance(s) that require more than 4 GB of memory, then enable the use of /PAE.

4. Allocate Enough Memory For SAP And Other Applications (if any) In The Same Server: If SAP and other applications, such as file and print server services, are running on the same server, make sure sufficient memory is allocated to both applications so that they have enough memory to run effectively.

In Step 4c of FIG. 4, Configure The SAP Work Process Type And Amount, consideration must be placed on the configuration of SAP work processes. SAP work processes perform unique functions. A dialog work process handles an interactive job; an update work process handles database update; a lock management work process handles locking at the SAP application level; a background work process handles background jobs processing; a spool work process handles printing services; a message server work process handles the communication between dispatchers; and a gateway work process handles the communication with the external system.

To achieve the optimal performance, configure the proper work process type to serve users requests or to perform tasks. The number of work processes depends on the workload the system will handle as well as the availability of the system resource such as processors and memory. Too few work processes results in high response time or long running time and too many work processes adversely affects system performance because system resources are depleted.

Configure the SAP work process type and the number of work processes for each SAP system through profile parameters.

In Step 4d of FIG. 4, SAP Processor Affinity, the ability to assign SAP work processes to run on specific processors is called processor affinity. Processor affinity improves overall system performance because SAP processes share the data residing on the shared cache among groups of processors and thereby minimize system latency.

By default, SAP automatically assigns SAP work processes to run on any CPU in the system. To improve system performance, follow the following strategy:

1. Utilize Shared Cache: Each SAP instance has a shared memory area where all SAP work processes can share. Therefore, if multiple instances are running on a system, it is best to group SAP work processes of the same instance together in such a way that the processes can have access to the shared memory area as efficiently as possible.

Figure 7:
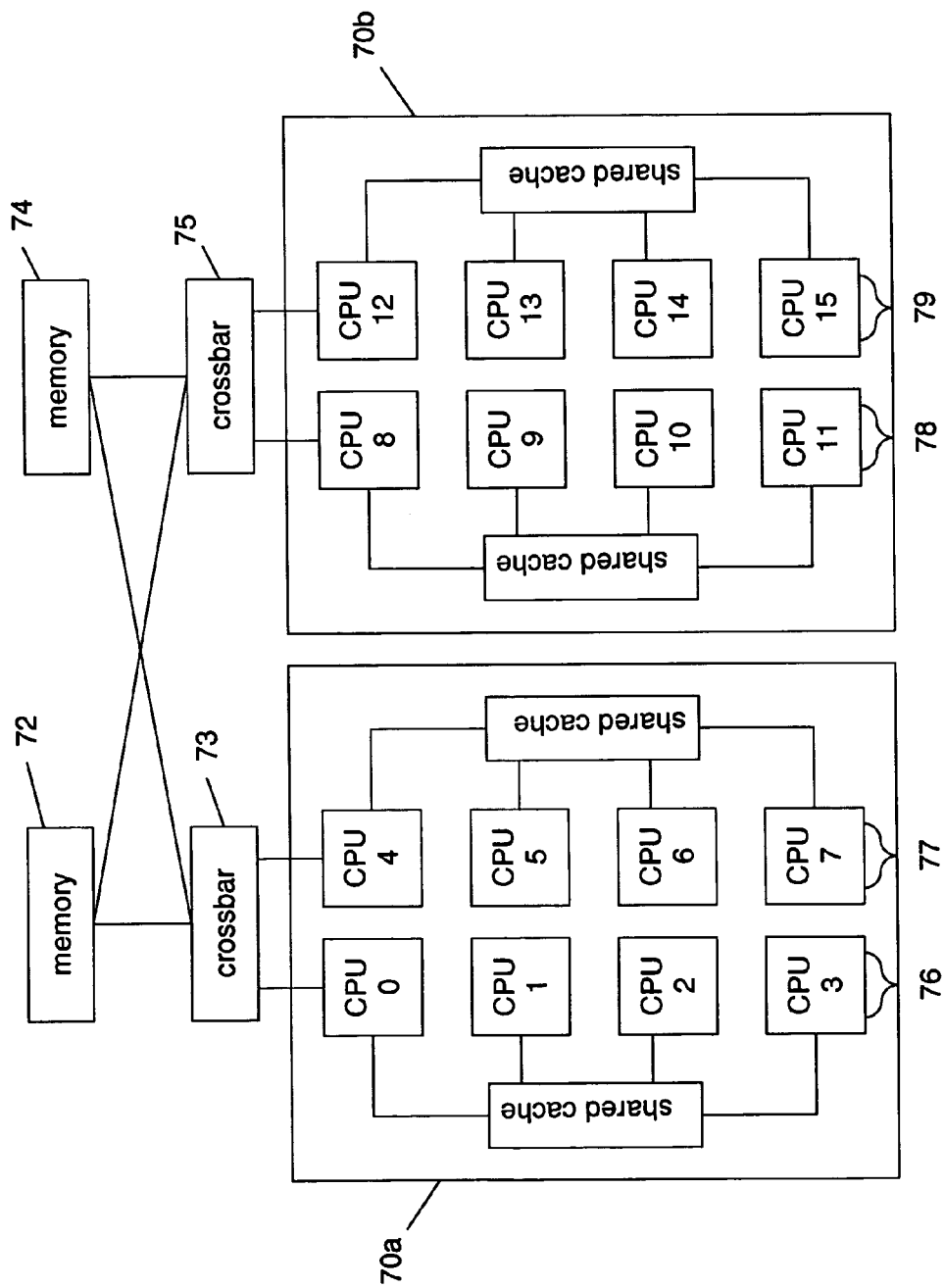
FIG. 7 illustrates a 16-CPU partition of a 32-bit ES70000 system. The partition consists of 4 subpods. Each subpod has 4 CPUs and a shared cache.

For 32-bit, each processor sub-module (subpod) is a set of four CPUs with its own shared cache, as seen in FIG. 7. The shared cache allows processors to minimize memory latency and reduce contention for scarce bandwidth to and from memory by keeping accesses as close to the processor as possible, thus enabling faster accesses with fewer global system resource consumptions. When shared cache is used, data pages and instruction modules are located next to the processors that use them, in the fastest available form of memory.

On a 32-bit system, assign SAP work processes of an instance to the CPUs in the same subpod. This way all SAP work processes in the same SAP instance can have faster access to the shared memory area because the memory latency is minimized through the use of shared cache.

Figure 8:
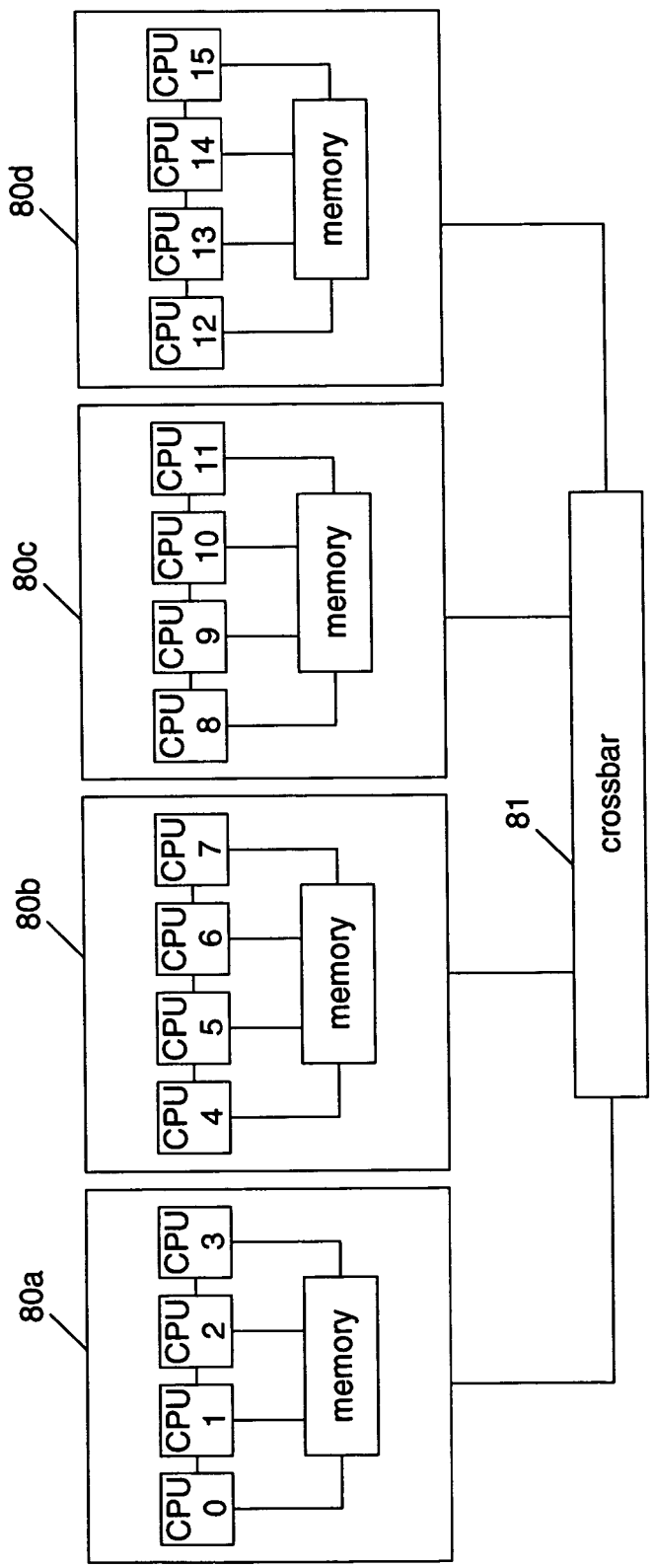
FIG. 8 illustrates a 16-CPU partition of a 64-bit ES70000 system. The partition consists of 4 processor/memory modules. Each processor/memory module has 4 CPUs with its own memory.

On a 64-bit system, a group of four processors and memory is called a processor/memory module, as seen in FIG. 8. Apply the same tuning technique as 32-bit system by assigning SAP work processes of an instance to the CPUs in the same processor/memory module. Using the CPUs located in the same processor/memory module allows the SAP work processes to share the same local memory and reduce the memory request latency time to access the memory across different processor/memory modules and this in turn will minimize memory latency and reduce system level bottlenecks.

2. Balance Workload: Whenever possible, balance workload across all CPUs so that no CPU is over-utilized or under-utilized. Assigning too much workload on some CPUs would create a system bottleneck. A good strategy is to balance SAP work processes across all the CPUs. For example, if a 16-processor system has four SAP instances running and each instance handles approximately the same amount of workload, assign each instance to run individually on 4 CPUs. A SAP instance consists of a set of processes that can be started and stopped together. For example, a SAP dialog instance, which is responsible for handling interactive user workload, contains two dialog work processes, and a dispatcher process.

Enable processor affinity for SAP work process through profile parameters.

In Step 4e of FIG. 4, Table Buffering, table buffering technique allows an SAP application to access the data from a local memory of the application server instead of going to the database. This improves the performance significantly because the database access time is a lot longer than the access time of local memory. In addition, table buffering minimizes database server load and avoids blocking of a SAP work process, as the work processes must wait for the data to be retrieved from the database before proceeding.

If a buffered table is updated, the update is executed on the database and the updated record is either updated on the local buffer or the record is marked as invalid and will be reloaded on the next access. The buffer on a non-local instance is not updated automatically but will be updated on the next buffer synchronization. SAP has a buffer synchronization mechanism in order to ensure that all SAP buffers across all SAP instances see the newly updated data on the database. Since the updated record introduces some overhead for invalidation and synchronization of buffered tables, table buffering should not be used for frequently updated tables.

In order to achieve good performance, only buffer a table if it is read frequently and if it is acceptable from an application or business point of view that changes to the data in the table are not immediately visible on all other SAP instances. Enable table buffering by calling a transaction in the SAP system. Also maintain profile parameters in order to control buffer synchronization for the system as well.

In Step 4f of FIG. 4, Number Range Buffering, number range buffering allows users to implement buffering mechanisms for SAP number range objects. If no buffering is implemented, performance bottleneck may occur at high volume of workload because only one process can have access to the number range objects at a time. Number range buffering technique is an option to buffer the number ranges in the SAP system. An advantage offered by buffering a number range is the increase in performance, since parallel processes can avoid lock/wait at the database level during number range assignment.

However, there are some disadvantages from buffering number range. One of the disadvantages is that numbers are generated in a non-consecutive sequence. In addition, under certain circumstances, certain numbers are not assigned at all which means that these numbers are skipped. This might not be acceptable in some business scenarios.

Consider both the above-mentioned advantages and disadvantages before considering the number range buffering option. If the business requires a consecutive and complete sequence of numbers (for example invoice document numbers) for a number range, do not set buffering for this number range.

Whenever possible, if business requirements can afford to have some gaps in number range for certain documents and a large amount of documents are generated, consider number range buffering to optimize the performance.

There are different levels of number range buffering. Select an appropriate level for the system. Those levels include:

1. No Buffering: There is no buffering implemented. Performance bottlenecks may occur because there is lock/wait with parallel processing. The only advantage is that there is no gap in number allocation. Every number is assigned in chronological order. Only use this technique if it is essential to have no gap in number allocation and only a low system throughput is needed.

2. Main Memory Buffering: The number range is buffered in main memory. There is no lock wait problem. It is a fast and efficient way because accessing the data from the memory on an application server is faster than from the database server. On the other hand, there are some limitations. There may be some gaps in the number allocation and the numbers may be assigned in a non-consecutive sequence.

3. Local, On Instance Level Buffering: The number range is temporarily stored on the database table, called NRIV_LOKAL. The number range and SAP instance number are used as part of a key. The performance is improved because the lock/wait problem is reduced. The advantage is that the number allocation is almost gap-free. However, the number may be assigned in a non-consecutive sequence. The drawback is that locks still occur within an instance. If high throughput is required, it is necessary to have users simultaneously work on many SAP instances.

4. Local, On Instance And Work Process Level: The number range is temporarily stored on the database table, called NRIV_LOKAL. The number range, SAP instance number, and work process number are used as part of a key. The lock/wait problem is eliminated. The number range allocation is almost gap-free. However, the number may be assigned in a non-consecutive sequence.

To enable the number range buffering, execute an SAP transaction called SNRO in an SAP system.

After applying the third sequence in the process as shown in FIG. 4, the SAP application component is optimized and the performance bottleneck is thus avoided.

Figure 5A:
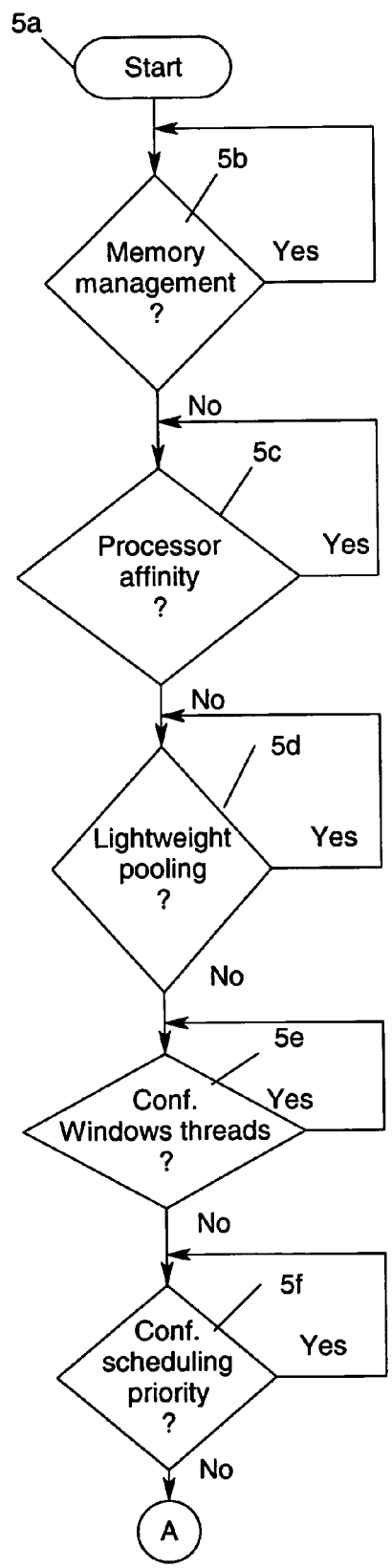
FIG. 5, shown as 5A and 5B, illustrates the last step in the process, which is to identify tuning opportunities in the Database Management System (DBMS) software component and its subcomponents. This step includes SQL Server memory management, SQL Server processor affinity, configuring lightweight threads or fibers, configuring the Windows threads, configuring the scheduling priority, configuring parallel query, configuring network connection affinity, SAP database configuration, and SAP database object configuration.
Figure 5B:
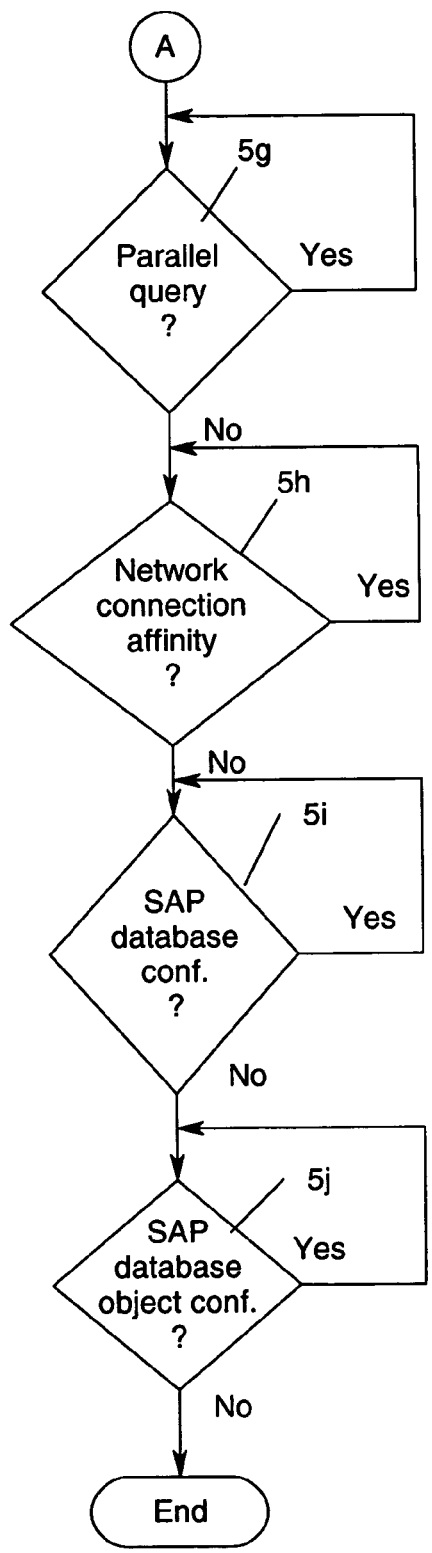

The last sequence in the process is shown in FIGS. 5A and 5B. This sequence identifies tuning opportunities in the Database Management System software (DBMS) component and its subcomponents. How each component will be evaluated and tuned can be summarized as follows:

1. SQL Server Memory Management (Step 5b): Memory management is the ability of SQL Server to allocate, free, and generally manage memory resources. Memory management is critical to the performance of a 32-bit system due to the addressable memory space limitation. On a 32-bit system, memory can only be addressed up to 4 GB. It is not a critical issue on a 64-bit system as memory can be addressed up to $4*2^{32}$ GB.

2. SQL Server Processor Affinity (Step 5c): The affinity mask option is used to specify the CPUs on which SQL Server threads can run in a multiprocessor environment. The default value of zero (0) specifies that the OS scheduling algorithms determine the thread affinity. A non-zero value sets a bitmap that defines the CPUs on which SQL Server can run.

3. Lightweight Threads Or Fibers (Step 5d): The lightweight pooling is an option to configure the SQL Server to use lightweight threads, or fibers. Using fibers can reduce the number of context switches by enabling SQL Server, rather than the OS scheduler, to handle scheduling. If SQL Server is running on a multiprocessor system and a large number of context switches occur, try setting the lightweight pooling option to one (1). The default value, zero (0), specifies the threads mode. Use the lightweight pooling option to provide a mean of reducing the system overhead associated with the excessive context switching sometimes seen in symmetric multiprocessor (SMP) environments. When excessive context switching is present, lightweight pooling may provide better throughput by performing the context switching inline, thus helping to reduce user/kernel ring transitions.

When lightweight pooling is enabled, each user-mode scheduler (UMS) uses a single thread to control the scheduling of work requests on fibers. The number of fibers is controlled by the max worker threads parameter in SQL Server.

4. Configure The Windows Threads (Step 5e): Use the max worker threads parameter to specify the maximum number of Windows threads that SQL Server can use. Adjust this parameter to enable more threads for processing within SQL Server. If SQL Server uses too many threads, the OS may become overloaded.

5. Configure The Scheduling Priority (Step 5f): A value one (1) for the priority boost parameter specifies that the SQL Server run at a higher OS scheduling priority than it normally would. The default value of zero (0) disables priority boost option. Setting the priority boost to one (1) can improve SQL Server performance, but it can keep other processes from getting sufficient CPU time. Set this value to one (1) if SQL Server is the only program running on the computer system.

6. Parallel Query (Step 5g): The option to execute queries in parallel in the SAP R/3 system can impact the overall performance of the system. In some cases, this option greatly improves the SAP R/3 performance.

7. Network Connection Affinity (Step 5h): In some cases, network connection affinity greatly improves the performance of the SAP R/3 system. In an OLTP environment, the connection affinity mask option can enhance performance in high-end, enterprise-level SQL Server environments that are running on computers with 16 or more CPUs. In particular, this option is useful when there are a significant number of network interactions (more than 10,000 per second) between the middle-tier application servers and the back-end SQL Server system.

8. SAP Database Configuration (Step 5i): There are some SQL Server settings that are specific to the SAP R/3 database. Unlike the server-wide parameter changes, which affect all of the databases on the server, the additional SQL Server settings that are specific to SAP R/3 database are set and controlled by the R/3 installation or upgrade process. To improve performance, disable the options Automatic Statistics Creation, Automatic Statistics Update, and ANSI nulls.

9. SAP Database Object Configuration (Step 5j): Within the database, there are two options: (i) autostats; and (ii) page-level locks that should be disabled for a few critical tables. This has proven over time to benefit performance of the R/3 application.

In FIG. 5A, the sequence starts at step 5a and proceeds to step 5b which requires a decision whether to apply memory management tuning technique. If the answer is "YES", then the sequence repeats at step 5b to manage the memory. If the answer is "NO", the sequence proceeds to step 5c, which requires a decision whether to apply SQL processor affinity tuning. If the answer is "YES", then the sequence repeats at step 5c. If the answer is "NO" then proceeds to step 5d, which requires a decision whether to apply SQL lightweight pooling tuning. If the answer is "YES", then step 5d is repeated. If the answer is "NO", then proceeds to step 5e. Step 5e requires a decision whether to configure the Windows threads. If the answer is "YES", step 5e is repeated. If the answer is "NO", then it proceeds to step 5f. Step 5f requires a decision whether to configure scheduling priority. If the answer is "YES", step 5f is repeated. If the answer is "NO", then the process continues to marker A over to FIG. 5B.

In FIG. 5B, step 5g requires a decision whether to enable SQL parallel query option. If the answer is "YES", then step 5g is repeated. If the answer is "NO", the sequence proceeds to step 5h. At step 5h, the decision is made whether to apply network connection affinity tuning. If the answer is "YES", the sequence repeats at step 5h. If the answer is "NO", the sequence proceeds to step 5i. Step 5i requires a decision whether to configure SAP database for optimization. If the answer here is "YES", then step 5i is repeated. If the answer is "NO", the sequence proceeds on to step 5j. Step 5j requires a decision whether to configure SAP database object. If the answer here is "YES", then step 5j is repeated. If the answer here is "NO", then the sequence ends at step 5k.

In Step 5b of FIG. 5A, SQL Server Memory Management, memory management is a major consideration for the DBMS software, especially on a 32-bit system as memory can only be addressed up to 4 GB. This memory space limitation presents a good opportunity for tuning to help improve the overall system performance. The following memory management tuning techniques can improve the performance of DBMS running on a 32-bit system:

1. Address Windowing Extensions (AWE): AWE is a set of extensions that allows an application to manipulate physical memory greater than 4 GB.

AWE lets applications acquire physical memory as non-paged memory, and then dynamically map views of the non-paged memory to the 32-bit address space. This enables memory-intensive applications such as Database Management System software to address more memory than it can be supported in the standard 32-bit address space.

Consider the following implications when using AWE in SQL Server 2000:

The SQL Server instance no longer dynamically manages the size of the address space.

All memory is acquired at startup and remains available until shut down.

Memory pages using AWE come from non-paged pool. In other words the memory pages of the instance will not be swapped out.

In order for the OS to see beyond 4 GB of physical memory, PAE switch must be set in boot.ini system file. To set AWE, SQL Server must be run by an account with "Lock Page in Memory" permission. Also, there must be at least 3 GB of free memory available on the computer for SQL Server to run in AWE mode.

When the AWE option is set, the following message is recorded in the SQL Server error log:

Address Windowing Extension enabled

2. Static vs. Dynamic Memory: Memory configuration for SQL Server depends on the following factors:

The existence of SQL Server and other applications in the same system;

The amount of available memory

Based on these two factors, assign the appropriate values to the SQL Server options.

Table II shows the SQL Server options.

TABLE II

| SQL Server Options | Abbreviation |
| --- | --- |
| min server memory (MB) | MIN (MB) |
| max server memory (MB) | MAX (MB) |
| set working set size | SWS |
| awe enabled | AWE |

SQL Server dynamically allocates memory for optimal performance. The max and min server memory configuration settings exist as a way to override the default behavior of automatic memory allocation. Configuring memory as static is beneficial when other processes doing substantial work might make it difficult for SQL Server to dynamically allocate memory properly. To configure memory as static, set min server memory and max server memory to the same value. This configuration effectively allocates a chunk of memory of the size indicated by the min and max server memory value. Configure SQL Server memory as static under the following conditions:

Running SQL Server and other applications on the same system

AWE option is enabled

The Set Working Set Size setting reserves an amount of physical memory for SQL Server that is equal to the server memory setting. When the Set Working Set Size is set to one (1), the OS does not swap out SQL Server pages. If the server memory is configured as static, set the Set Working Set Size value to one (1). If the server memory is configured as dynamic, set the Set Working Set Size value to zero (0).

Table III shows the relationship between max and min server memory and Set Working Set Size values.

TABLE III

| Server memory | Memory | Set working set size value |
| --- | --- | --- |
| Max = min server memory | Static | 1 |
| Max < > min server memory | Dynamic | 0 |

In the three-tier client/server implementation, SQL Server is running on a standalone database server. In this case, SQL Server is the only application running on the database system. To achieve best performance, allocate most of the memory to SQL Server, but leave some for the OS and the kernel, as they require some memory in order to run.

Table IV shows the settings for a standalone database server running SQL Server. For memory larger than 16 GB, do not set the /3 GB switch because Windows requires more than 1 GB to manage Address Windowing Extension (AWE).

Table IV shows standalone database server settings for SQL Server 2000.

TABLE IV

| Total RAM (GB) | MAX (MB) | MIN (MB) | SWS | AWE 0-disable 1-enable | /3 GB | /PAE |
| --- | --- | --- | --- | --- | --- | --- |
| <=2 | 2147483647 | 0 | 0 | 0 | N | N |
| >2 <= 4 | 2147483647 | 0 | 0 | 0 | Y | N |
| >4 <= 8 | RAM – 1000 MB | RAM – 1000 MB | 0 | 1 | Y | Y |
| >8 <= 16 | RAM – 1000 MB | RAM – 1000 MB | 0 | 1 | Y | Y |
| >16 | RAM – 2000 MB | RAM – 2000 MB | 0 | 1 | N | Y |

For other implementation such as two-tier client/server where database and application services are running on the same physical server, a user needs to manage memory for SQL Server differently. For example, if several applications are running on one server such as SQL Server and SAP R/3, allocate sufficient memory for both programs to run effectively. TABLE V illustrates the setting for SQL Server and an SAP R/3 instance. Following are some additional guidelines:

Allocate memory for SAP R/3 by using the PHYS_MEMSIZE parameter in the SAP R/3 profile. An SAP R/3 profile is a configuration file that allows user to control certain aspects of SAP behavior like buffer size, memory size, database specific performance settings and work process affinity.

Add 1 GB of additional memory to the max server memory option for AWE management for server with memory larger than 16 GB.

Set the min server memory value to a value less than 16 GB because SAP R/3 requires 3 GB of physical memory.

Table V shows SQL Server 2000 and SAP R/3 settings.

TABLE V

| SAP R/3 Instance | Total RAM (GB) | R/3 Memory as % of RAM | MAX (MB) as % of RAM | MIN (MB) as % of RAM | SWS | AWE 0-disable 1-enable | /3 GB | /PAE |
|---|---|---|---|---|---|---|---|---|
| Central (CI) | <=3 | <45% | 45% | 45% | 1 | 0 | N | N |
| Update (UP) | <=3 | <40% | 50% | 50% | 1 | 0 | N | N |
| CI or UP | >3 <= 4 | 1 GB | 90% – 1 GB | 90% – 1 GB | 1 | 0 | Y | N |
| CI or UP | >4 <= 8 | X GB | 90% – X GB | 90% – X GB | 0 | 1 | Y | Y |
| CI or UP | >8 <= 16 | X GB | 90% – X GB | 90% – X GB | 0 | 1 | Y | Y |
| CI or UP | >16 | X GB | 90% – (X + 1) GB | 90% – (X + 1) GB | 0 | 1 | N | Y |

In Step 5c of FIG. 5A, SQL Server Processor Affinity, the affinity mask is a SQL Server option used to specify the CPUs on which SQL Server threads can run in a multiprocessor environment. The default value of zero (0) specifies that the OS scheduling algorithms determine the thread affinity. A nonzero value sets a bitmap that defines the CPUs on which SQL Server can run.

Table VI shows sample binary values.

TABLE VI

| Decimal values | Binary values | Hex values |
|---|---|---|
| 15 | 1111 | 0xf |
| 255 | 11111111 | 0xff |
| 65535 | 1111111111111111 | 0xffff |

If SQL Server is the only application running on the system, set the affinity mask option to enable SQL Server to use all of the CPUs. On a system where SQL Server coexists with other applications and competes for CPU time, set affinity mask option so that CPU time is allocated among all processes.

If SQL Server and other applications are running on the same system, there is an important consideration for both 32-bit and 64-bit systems. For a 32-bit system, set the affinity mask option to allow SQL Server to run on CPUs in the same subpod. For a 64-bit system, set the affinity mask option to allow SQL Server to run on CPUs in the same processor/memory module. This tuning technique improves system performance as it takes advantage of the shared cache and local memory access.

In Step 5d of FIG. 5A, Lightweight Threads Or Fibers, the lightweight pooling parameter is used to configure SQL Server to use lightweight threads, or fibers. The use of fibers can reduce context switches by enabling SQL Server, rather than the OS scheduler, to handle scheduling. When a user observes a large number of context switches while running an application on a multiprocessor system, set the lightweight pooling parameter to one (1). The default value is zero (0), which specifies the threads mode.

When lightweight pooling is enabled, each user mode scheduler (UMS) uses a single thread to control the scheduling of work requests on fibers. The number of fibers is controlled by the max worker threads parameter in SQL Server.

In Step 5e of FIG. 5A, Configure The Windows Threads, use the max worker threads parameter to specify the maximum number of Windows threads that SQL Server can use. Adjust this parameter to enable more threads for processing within SQL Server. Beware that if SQL Server uses too many threads, the OS becomes overloaded.

In Step 5f of FIG. 5A, Configure Scheduling Priority, a value of one (1) for the priority boost parameter specifies that SQL Server run at a higher OS scheduling priority than it otherwise would. The default value of zero (0) disables priority boost option. Setting priority boost to one (1) can improve SQL Server performance, but can also keep other processes from getting sufficient CPU time. Set this value only if SQL Server is the only application running on the system.

In Step 5g of FIG. 5B, Parallel Query, parallel query allows SQL Server to perform a query in parallel by using multiple operating system threads. Parallel query is particularly useful when running complex queries with large amount of data as the jobs can be processed in parallel. Parallel query tuning technique can generate various effects for SAP R/3 systems. Generally, most R/3 systems are Online Transaction Processing (OLTP) systems that execute large volumes of simple SQL statements. In such cases, queries execute in parallel may not improve system performance because parallel query can consume multiple CPU resources and may prevent other queries from being processed and thereby slowing overall system performance. For this reason, the max degree of parallelism should be reduced to 50% of the number of available CPUs or to one (1), which disable parallelism.

Changing the max degree of parallelism value depends on the situation. A Business Warehouse (BW) or an Advanced Planner and Optimizer (APO) system differs from a typical R/3 system in regards to setting the parallelism parameter. Generally, BW and APO systems benefit from parallelism, or setting the max degree of parallelism value to zero (0), which uses the number of available processors in the system, during the aggregate loading phases that are usually performed at night. This is particularly true when aggregate loading is done in a single process when no other users or batch jobs are using system resources. During normal operations, BW systems have the max degree of parallelism set to 1 for typical daily operations. Validate the degree of parallelism by performing the stress test and measuring performance improvement.

If a user's environment has a mixed mode R/3 OLTP that is also used to synthesize BW or APO data, it is possible to dynamically alter the max degree of parallelism parameter as desired because the max degree of parallelism server parameter is set dynamically. One example is to set a job to use the zero (0) value at 1 A.M., during which the BW aggregates could synthesize for a few hours. Then schedule the value to be reset to one (1) before OLTP users log in and start using the system in the morning. Again, validate the degree of parallelism by performing the stress test and measuring performance improvement.

In Step 5h of FIG. 5B, Network Connection Affinity the network connection affinity is used in the following scenarios:

SQL Server needs to handle a large number of network requests from clients over the VIA transport.

Provide workload balancing and data locality.

The connection affinity mask is an option provided by SQL Server 2000 Service Pack (SP) 1 or later, which provides performance enhancement through the use of VIA transport protocol where a network reader thread is created for each port defined. This thread can be restricted to run on a defined set of CPUs with a specified mask. The network thread will only distribute work items to schedulers running on the same set of CPUs as defined by the connection affinity mask. The work items from the connections behind a VIA port are handled by a restricted number of CPUs as defined by the connection affinity mask. This feature provides the ability to partition the workload.

For example, on a 16-CPU system, all batch jobs could be routed through a nic:port [cpu mask 0xf000] while the OLTP load could be routed through a separate nic:port [cpu mask 0x0fff]. In this scenario, SQL Server will use the first four CPUs to handle the batch load and the remainder to handle the OLTP load. Note that in this example, the affinity mask configuration option should be set to 0xffff.

In an OLTP environment, the connection affinity mask option can enhance performance in high-end, enterprise-level SQL Server environments that are running on computers with 16 or more CPUs. Connection affinity mask option defines a set of CPUs that will handle SQL Server network connections. For the VIA transport, a network reader thread is created for each port defined. This thread can be restricted to run on a defined set of CPUs with a specified mask. In particular, this option is useful when there are a significant number of network interactions (e.g. more than 10,000 per second) between the middle-tier application servers and the back-end SQL Server system.

Use the Server Network Utility to define protocols and ports that SQL Server uses to monitor activity. For the VIA transport, a network reader thread is created for each port that is defined. This thread can be restricted to run on a defined set of CPUs with a specified mask. The network thread will distribute work items to schedulers running on the same set of CPUs as defined by the connection affinity mask. Scheduler, within the context of SQL Server, is a function within SQL Server that controls the scheduling of threads and fibers in the system. These schedulers ensure SQL Server can maximize operating system resource usage in relation to key database actions.

Use the connection affinity mask in conjunction with the processor affinity mask system configuration option. The connection affinity mask is a subset of the affinity mask configuration option.

Following are some additional points concerning the connection affinity mask:

The VIA port number is not the same as the TCP port number.

The connection affinity mask is represented in hexadecimal, preceded by 0x or 0X.

The mask is a bitmap in which the rightmost bit specifies the lowest-order CPU (0); the next rightmost bit specifies the next lowest-order CPU (1), and so on.

A one-byte connection affinity mask covers up to eight CPUs in a multiprocessor computer, a two-byte mask covers up to 16 CPUs, a three-byte mask covers up to 24 CPUs, and a four-byte mask covers up to 32 CPUs.

To enable connection affinity on a specific CPU, set the bit corresponding to this CPU in the connection affinity mask to one (1).

When all bits are set to zero (0), or when a connection affinity mask is not specified, SQL Server network I/O processing is performed by any of the CPUs that are eligible to process SQL Server threads.

The value of the connection affinity mask cannot be changed while SQL Server is running. To change the connection affinity mask, make the necessary change, shut down and restart the SQL Server instance.

In Step 5i of FIG. 5B, SAP Database Configuration there are some SQL Server settings that are specific to the SAP R/3 database. Unlike the server-wide parameter changes, which affect all of the databases on the server, the additional SQL Server settings that are specific to SAP R/3 database are set and controlled by the R/3 installation or upgrade process. To improve performance, disable the options Automatic Statistics Creation, Automatic Statistics Update, and ANSI nulls. When enabled, SQL Server automatically updates the statistics on table columns when a large number, or high percentage, of rows in the table change through update, insert, or delete operations. SQL Server automatically determines when to update statistics.

The following queries can be used to assess their status, substituting the name of the R/3 database in place of the <SAPSIDDB> parameter. If the database option is properly enabled, each query will return a value of one (1).

SELECT DATABASEPROPERTYEX ('<SAPSIDDB>', 'IsAutoCreateStatistics')

SELECT DATABASEPROPERTYEX ('<SAPSIDDB>', 'IsAutoUpdateStatistics')

SELECT DATABASEPROPERTYEX ('<SAPSIDDB>', 'IsAnsiNullsEnabled')

| Value | Description | Value returned |
| --- | --- | --- |
| IsAnslNullDefault | Database follows SQL-92 rules for allowing null values. | 1 = TRUE<br>0 = FALSE<br>NULL = Invalid input |
| IsAutoCreateStatistics | Existing statistics are automatically updated when the statistics become out-of-date because the data in the tables has changed. | 1 = TRUE<br>0 = FALSE<br>NULL = Invalid input |
| IsAutoUpdateStatistics | Auto update statistics database option is enabled. | 1 = TRUE<br>0 = FALSE<br>NULL = Invalid Input |

To enable these options, use the ALTER DATABASE command as in the following example:
ALTER DATABASE <SAPSIDDB> SET AUTO_CREATE_STATISTICS ON
ALTER DATABASE <SAPSIDDB> SET AUTO_UPDATE_STATISTICS ON
ALTER DATABASE <SAPSIDDB> SET ANSI_NULLS ON In Step 5j of FIG. 5B, SAP Database Object Configuration, consideration must be placed on two database options autostats and page-level locks. The autostats and page-level locks options should be disabled for a few critical tables. This has proven over time to benefit performance of the R/3 application.

Autostats is a statistical maintenance function. Autostats automatically update the statistics for a particular table when a "change threshold" has been reached. As a result, it can generate unwanted overhead on a system by initiating statistical updates during heavy workload processing and thereby adversely affecting the system performance. Verify the setting through Query Analyzer from within the context of the R/3 database and execute the following queries:
EXEC sp_autostats VBHDR
EXEC sp_autostats VBDATA
EXEC sp_autostats VBMOD Each query should indicate that the autostats column for each index is turned OFF. If this is not the case, disable autostats with the same stored procedure in the following fashion:
EXEC sp_autostats VBHDR, 'OFF'
EXEC sp_autostats VBDATA, 'OFF'
EXEC sp_autostats VBMOD, 'OFF'

SQL Server 2000 dynamic locking strategy automatically chooses the best locking granularity for queries in most cases. However, in some cases, it is best to disable the page-level locks and only allow index accessed at row or table level. Disable page-level locks to reduce overhead. Disable the page-level locks for the following tables: VBHDR, VBMOD, VBDATA, ARFCSDATA, ARFCRDATA, and TRFCQUEUE.

To display the current locking option for a given index, use the INDEXPROPERTY function. Here is the syntax:
SELECT INDEXPROPERTY (TableId, IndexName, 'IsPageLockDisallowed')

It is possible to assess page-level locks only for one particular index, assuming that the clustered index will adequately describe the state of this option in any one of the tables, which is most likely the case. Execute the following SQL statements from Query Analyzer within the context of the R/3 database:

Note that if each statement returns a value of one (1), the option is disabled.
SELECT INDEXPROPERTY (OBJECT_ID ('VBHDR'), 'VBHHDR~0', 'IsPageLockDisallowed')
SELECT INDEXPROPERTY (OBJECT_ID ('VBDATA'), 'VBDATA~0', 'IsPageLockDisallowed')
SELECT INDEXPROPERTY (OBJECT_ID ('VBMOD'), 'VBMOD~0', 'IsPageLockDisallowed')
SELECT INDEXPROPERTY (OBJECT_ID ('ARFCSDATA'), 'ARFCSDATA~0', 'IsPageLockDisallowed')
SELECT INDEXPROPERTY (OBJECT_ID ('ARFCRDATA'), 'ARFCRDATA~0', 'IsPageLockDisallowed')

A returned value of zero (0) indicates Page Locks might be set for these tables. To improve performance, disable Page Locks for these tables using the following syntax:
EXEC sp_indexoption 'VBHDR', 'DisAllowPageLocks', TRUE
EXEC sp_indexoption 'VBDATA', 'DisAllawPageLocks', TRUE
EXEC sp_indexoption 'VBMOD', 'DisAllowPageLocks', TRUE
EXEC sp_indexoption 'ARFCSDATA', 'DisAllowPageLocks', TRUE
EXEC sp_indexoption 'ARFCRDATA', 'DisAllowPageLocks', TRUE
IF OBJECT_ID ('TRFCQUEUE') IS NOT NULL
BEGIN
EXEC sp_indexoption 'TRFCQUEUE', 'DisAllowPageLocks', TRUE
END Additionally, if SAP version 6.10 or later is used, disable Page Locks in table D010TAB as follows:
EXEC sp_indexoption 'D010TAB', 'DisAllowPageLocks', TRUE After applying the process sequence as shown in FIG. 5, the Database Management System (DBMS) component and its subcomponents are optimized and the performance bottleneck is thus avoided.

Figure 6:
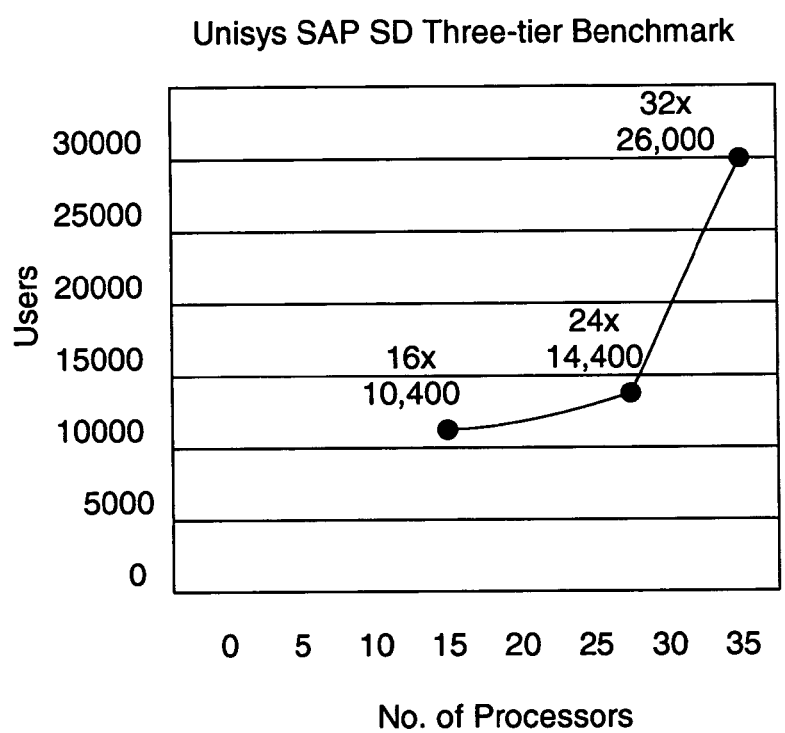
FIG. 6 is a graph showing the benchmark results after applying the optimizing process on 16-, 24-, and 32-processor Unisys ES7000 systems.

FIG. 6 is an illustration of final results which will be discussed later herein at the end of the drawings discussions.

FIG. 7 demonstrates a 16-CPU partition of a 32-bit ES70000 system consisting of 4 subpods. Each subpod has 4 CPUs and a shared cache.

As seen in FIG. 7, partition 70a is composed of a series of CPUs 0, 1, 2, and 3, designated as item 76. Likewise, the CPUs 4, 5, 6 and 7 are designated as item 77. Each set of the CPUs 76 and 77 has its own shared cache unit. The two sets of CPUs 76 and 77 are connected to a crossbar 73, which connects to a memory unit 72.

Likewise in FIG. 7, the partition 70b is composed of a series of CPUs 8, 9, 10 and 11, designated as item 78, and CPUs 12, 13, 14 and 15 are designated as item 79. Each of these sets of CPUs has a shared cache module. The CPUs 78 and 79 are connected to a crossbar 75, which connects to a memory unit 74.

As noted in FIG. 7, both memory units 72 and 74 can be accessed using the crossbar interconnects 73 and 74.

In order to achieve better performance in FIG. 7, set SAP process affinity to allow the SAP processes to fully utilize shared cache as much as possible. For example, if 4 SAP instances are running on this partition, set SAP processor affinity as follows:
All work processes for the first instance run on CPUs 0, 1, 2, and 3.
All work processes for the second instance run on CPUs 4, 5, 6 and 7.
All work processes for the third instance run on CPUs 8, 9, 10, and 11.
All work processes for the fourth instance run on CPUs 12, 13, 14, and 15.

FIG. 8 demonstrates a 16-CPU partition of a 64-bit ES70000 system consisting of 4 processor/memory modules. Each processor/memory module has 4 CPUs with its own memory.

As seen in FIG. 8, the 16-CPU partition is a 64-bit ES7000 system, which consists of four processor/memory modules designated 80a, 80b, 80c, and 80d. A crossbar interconnect module 81 connects these processor/memory modules to each other.

To achieve better performance, allow SAP processes in the same instance to run in the same process/memory module for a better utilization of local memory and reduce memory latency. For example, if there are 4 SAP instances running on this partition, set SAP processor affinity as follows:

All work processes for the first instance run on CPUs 0, 1, 2, and 3.

All work processes for the second instance run on CPUs 4, 5, 6 and 7.

All work processes for the third instance run on CPUs 8, 9, 10, and 11.

All work processes for the fourth instance run on CPUs 12, 13, 14, and 15.

Figure 9:
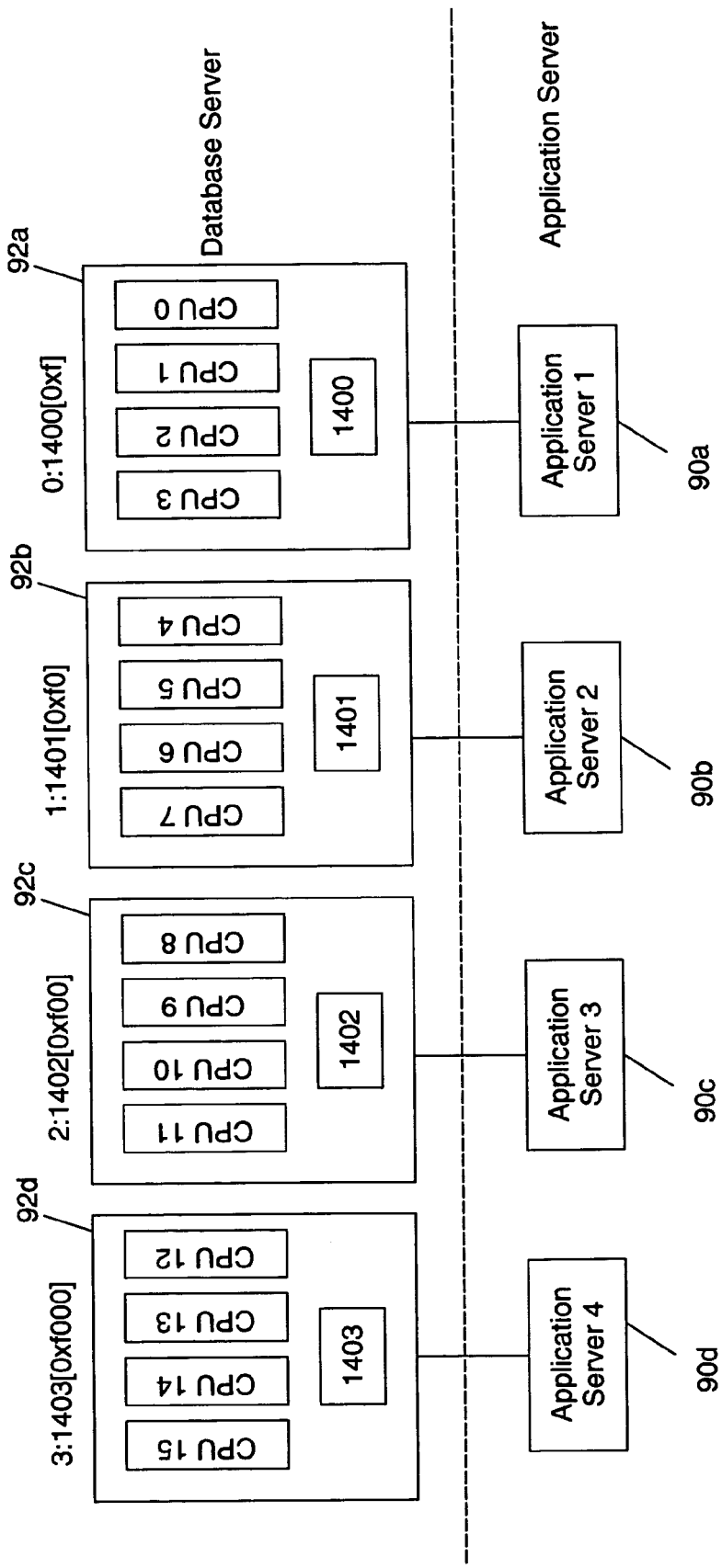
FIG. 9 demonstrates the Virtual Interface Architecture (VIA) network connection affinity for a 16-CPU server. It shows the network threads that handle connections from each application server running on a set of four CPUs using a predefined Virtual Interface Architecture (VIA) port.

FIG. 9 shows the VIA network connection affinity for a 16-CPU server. The VIA network connection affinity for a 16-CPU server shown in FIG. 9 indicates four subpods 92a, 92b, 92c, 92d. Each subpod in the database server 30 has four CPUs. In the four subpods, the CPUs are numbered 0 through 15. Each subpod has a VIA connection indicated as VIA 0, VIA 1, VIA 2 and VIA 3. Likewise, each of the subpods 92a . . . 92d is connected to an application server, respectively marked as 90a, 90b, 90c, and 90d.

To achieve better performance, set network connection affinity to allow network connections to be handled evenly across all subpods. For example, if there is a 16-CPU server as in FIG. 9, and SQL Server handles a large workload driven by four application servers, it is best to assign network threads that handle connections from each application server to run on a set of four CPUs as shown in FIG. 9. The connection affinity can be explained as follows:

Application Server 1 connects to the database server through VIA port 1400 and the network threads are running on CPUs 0, 1, 2, and 3.

Application Server 2 connects to the database server through VIA port 1401 and the network threads are running on CPUs 4, 5, 6, and 7.

Application Server 3 connects to the database server through VIA port 1402 and the network threads are running on CPUs 8, 9, 10, and 11.

Application Server 4 connects to the database server through VIA port 1403 and the network threads are running on CPUs 12, 13, 14, and 15.

To illustrate the effectiveness of this process, there was performed a series of benchmarks to show the exceptional results from applying the optimization process. These benchmark data show the viability of the process and how it can help to achieve the optimal results shown in FIG. 6.

In the SAP SD three-tier benchmarks, the process achieved 10,400, 14,400, 26,000 SAP SD benchmark users running on Unisys 16-, 24-, and 32-processor ES7000 systems respectively. These benchmarks have consistently achieved nearly an 80 percent "work output yield per processor" regardless of the size of the server tested. This achievement is an important proof point highlighting the importance of the process and how it can be applied effectively to achieve optimal results on the Unisys ES7000 multiprocessor servers.

FIG. 6 illustrates the proof point resulting from applying the process.

In FIG. 6, there is seen an illustrative graph, which shows the number of processors involved on the X axis, and the number of users involved on the Y axis.

The proof point results can be summarized as follows:

10,400 users on a 16-processor ES7000 system with response time of 1.83 seconds and 99 percent processor utilization.

14,400 users on a 24-processor ES7000 system with response time of 1.83 seconds and 89 percent processor utilization.

26,000 users on a 32-processor ES7000 system with response time of 1.97 seconds and 93 percent processor utilization.

Described herein has been a series of software optimizing processes for a three-tier client/server SAP Sales and Distribution implementation. Tuning techniques are applied to the software layer of the Operating System, the SAP application, and the Database Management System software to provide the most efficient operation in processing customer Sales and Distribution (SD) transactions running on a multiprocessor server.

The system and methods described herein are summarized in the attached claims which define the essential factors of the invention.

What is claimed is:

1. In a three-tier client/server Enterprise Resource Planning (ERP) Sales and Distribution (SD) implementation wherein multiple servers are connected with a network infrastructure, and wherein a database server operates with a storage system to provide database management services (DBMS), a method for optimizing software components for performance improvement in ERP comprising:
    (a) evaluating each software component in said network infrastructure;
    (b) identifying tuning opportunities for each software component, the identifying comprising:
        (b1) identifying tuning opportunities in an Operating System (OS), the identifying comprising:
            (b1a) selecting an appropriate OS;
            (b1b) selecting a proper device driver; and,
            (b1c) implementing Direct Input/Output (I/O) Bridge (DIB) to subpod mapping;
        (b2) identifying tuning opportunities in said ERP application;
        (b3) identifying tuning opportunities in said DBMS software; and,
    (c) applying tuning techniques to each software component to achieve best system performance and avoid poor performance and bottlenecks, the applying comprising:
        (c1) applying the said tuning technique to said OS, the applying comprising:
            (c1a) mapping DIBs to specific subpods to keep a process and its I/O interrupts together within the same subpod to reduce latency; and
            (c1b) mapping every DIB to its subpod to keep a process and its corresponding I/O interrupts together onto the same subpod if every DIB is filled with at least one Host Bus Adapter (HBA) and if all processors in the database server are evenly utilized;
        (c2) applying the said tuning technique to said ERP application; and
        (c3) applying the said tuning technique to said database server, which runs DBMS software.

2. The method of claim 1 where step (a) includes the steps of:
    (a1) evaluating the Operating System (OS);
    (a2) evaluating the ERP application;
    (a3) evaluating the Database Management System (DBMS) software.

3. The method of claim 1 wherein step (c1) includes the steps of:
    (c1c) selecting a version of the OS that supports 32-bit or 64-bit technology;
    (c1d) selecting an appropriate device driver for allowing the Operating System to manage hardware devices;
    (c1e) managing memory in the 32-bit technology to address memory limitation and to allow said Operating System to extend memory space for user applications and/or to take advantage of memory larger than four gigabytes if physical memory is available.

4. The method of claim 3 wherein step (c1c) includes the step of:
(c1c-1) selecting an Operating System version that the hardware can support, given the type of processors, number of processors, and the amount of physical memory in each type of server utilized.

5. The method of claim 3 wherein step (c1e) includes the steps of:
(c1e-1) extending addressable memory beyond four gigabytes by utilizing Physical Address Extension (PAE) if said database server has more than four gigabytes of physical memory;
(c1e-2) utilizing a switch to allow the Operating System to increase the user mode addressable space from 2 gigabytes (GB) to 3 GB;
(c1e-3) eliminating the use a switch if a database server has more than sixteen gigabytes of physical memory.

6. The method of claim 1 wherein step (c2) includes the steps of:
(c2a) configuring ERP memory management;
(c2b) configuring ERP work process type and amount;
(c2c) setting ERP processor affinity;
(c2d) choosing an appropriate table buffering scheme;
(c2e) choosing an appropriate type of number range buffering techniques.

7. The method of claim 6 wherein step (c2a) further includes the steps of:
(c2a-1) allocating sufficient memory to each ERP process without starving other processes running on the same server;
(c2a-2) reducing the number of ERP instances or ERP work processes if memory is insufficient;
(c2a-3) increasing virtual memory by adding paging files if there is not sufficient memory to allow ERP instances to run;
(c2a-4) using Physical Address Extension (PAE) technology on 32-bit technology to address memory beyond 4 gigabytes (GB) if more than 4 GB of physical memory is available;
(c2a-5) allocating sufficient memory to ERP and the other applications when running on the same server.

8. The method of claim 6 wherein step (c2b) further includes the steps:
(c2b-1) configuring ERP work processes to serve the user workload;
(c2b-2) configuring ERP work processes to perform tasks based on an amount of workload and available system resources.

9. The method of claim 6 wherein step (c2c) further includes the steps of:
(c2c-1) grouping ERP work processes of the same instance together, when more than one instance is running, so that these processes can access and share the same memory area;
(c2c-2) assigning ERP work processes of an ERP instance to a processor in the same sub-module (subpod), when running on a 32-bit system, to allow work processes from the same instance to access the same shared cache on each subpod to minimize memory latency;
(c2c-3) assigning ERP work processes of an ERP instance to processors in the same processor/memory module, when running on a 64-bit system, to minimize memory latency;
(c2c-4) balancing the ERP work processes so as to spread the workload evenly across all processors.

10. The method of claim 6 wherein step (c2d) further includes the steps of:
(c2d-1) enabling table buffering for frequently read tables with a small amount of updates in order to improve the database access time by storing and accessing data from local memory of an application server instead of going to the database.

11. The method of claim 6 wherein step (c2e) further includes the steps of:
(c2e-1) configuring the number range buffering techniques in an ERP system to improve performance by avoiding lock wait at database level during parallel processing;
(c2e-2) choosing "no buffering" technique for number ranges when it is essential to have no gaps in number allocation of documents and where very low system throughput is needed;
(c2e-3) choosing "main memory" buffering technique for number ranges when it is desirable to have high performance but allowing it to have some gaps in number allocation and the number can be assigned in a non-consecutive sequence;
(c2e-4) choosing "local", or on instance level buffering only technique, to temporarily store number range on a database table NRIV_LOKAL and have almost gap-free in number allocation, but allowing the drawback that locks still occur within an instance;
(c2e-5) choosing "local", or on instance level and work process level buffering technique, to temporarily store number range on a database table NRIV_LOKAL and have it almost gap-free in number allocation, as well as eliminating a lock/wait problem.

12. The method of claim 1 wherein step (c3) includes the steps of:
(c3a) configuring structured query language (SQL) Server memory;
(c3b) setting SQL Server threads affinity to run on specific processors;
(c3c) enabling lightweight threads or fibers;
(c3d) configuring Windows threads;
(c3e) configuring scheduling priority;
(c3f) configuring parallel queries where appropriate;
(c3g) setting network connection affinity;
(c3h) disabling SQL Server statistic creation and update;
(c3i) disabling SQL Server statistic collection and selecting the appropriate database lock granularity.

13. The method of claim 12 wherein step (c3a) further includes the steps of:
(c3a-1) configuring SQL Server memory specifically for the 32-bit technology to take advantage of the addressable memory space beyond 4 GB;
(c3a-2) using Address Windowing Extension (AWE) to manipulate memory beyond 4 GB;
(c3a-3) setting PAE at the OS level prior to using AWE;
(c3a-4) making a determination whether to use static or dynamic memory based on the implementation;
(c3a-5) setting the set working set size to reserve physical memory space for said SQL Server.

14. The method of claim 12 wherein step (c3b) further includes the step of:
(c3b-1) setting an affinity mask to specify the processors on which SQL Server threads can run in a multiprocessor environment.

15. The method of claim 12 wherein step (c3c) further includes the step of:
(c3c-1) setting lightweight pooling to reduce context switches by enabling said SQL Server, rather than the OS scheduler, to handle scheduling.

16. The method of claim 12 wherein step (c3d) further includes the step of:
  (c3d-1) configuring the maximum number of Windows threads that said SQL Server can use.

17. The method of claim 12 wherein step (c3e) further includes the step of:
  (c3e-1) setting priority boost option to specify that said SQL Server runs at a higher OS scheduling priority than it otherwise would.

18. The method of claim 12 wherein step (c3f) further includes the step of:
  (c3f-1) setting parallel query to allow queries to be executed in parallel for performance improvement.

19. The method of claim 12 wherein step (c3g) further includes the steps of:
  (c3g-1) setting network connection affinity to improve performance through workload balancing and data locality;
  (c3g-2) configuring the Virtual Interface Architecture (VIA) network protocol;
  (c3g-3) configuring the network threads to run on a specific set of processors.

20. The method of claim 12 wherein step (c3h) further includes the steps of:
  (c3h-1) reducing intrusive database activities that interfere with overall system performance;
  (c3h-2) disabling SQL Server automatic statistics creation and update.

21. The method of claim 12 wherein step (c3i) further includes the steps of:
  (c3i-1) reducing intrusive database activities that interfere with overall system performance;
  (c3i-2) disabling the SQL Server statistical maintenance function;
  (c3i-3) using less intrusive row-level or table-level lock as opposed to page-level lock.

* * * * *